United States Patent [19]
Oguro et al.

[11] Patent Number: 5,541,737
[45] Date of Patent: Jul. 30, 1996

[54] APPARATUS AND METHOD FOR RECORDING AND REPRODUCING A DIGITAL VIDEO AND AUDIO SIGNAL

[75] Inventors: Masaki Oguro, Tokyo; Hiroshi Yoshioka, Kanagawa; Teruhiko Kori, Kanagawa; Ken Iizuki, Kanagawa, all of Japan

[73] Assignee: Sony Corporation, Tokyo, Japan

[21] Appl. No.: 162,323

[22] Filed: Dec. 7, 1993

[30] Foreign Application Priority Data

Dec. 21, 1992 [JP] Japan ................... 4-340471
Jun. 10, 1993 [JP] Japan ................... 5-138646

[51] Int. Cl.$^6$ ............................... H04N 5/782
[52] U.S. Cl. ............ 358/335; 358/343; 360/10.1; 360/10.3; 360/191; 360/48; 360/72.1; 360/72.2
[58] Field of Search .................. 358/335, 343, 358/341, 310, 312; 360/9.1, 33.1, 10.1, 10.3, 18, 19.1, 48, 72.1, 72.2, 72.3; 369/47, 58; H04N 5/76, 5/78

[56] References Cited

U.S. PATENT DOCUMENTS

| | | | |
|---|---|---|---|
| 4,363,039 | 12/1982 | Nishimura et al. | 360/19.1 |
| 4,656,536 | 4/1987 | Furumoto et al. | 360/72.2 |
| 4,663,673 | 5/1987 | Doutsubo | 360/9.1 |
| 4,862,292 | 8/1989 | Enari et al. | 358/335 |
| 5,063,453 | 11/1991 | Yoshimura et al. | 360/8 |
| 5,148,331 | 9/1992 | Kashida et al. | 360/18 |
| 5,210,659 | 5/1993 | Oguri et al. | 360/72.2 |

FOREIGN PATENT DOCUMENTS

| | | |
|---|---|---|
| 0026320 | 4/1981 | European Pat. Off. |
| 0277549 | 8/1988 | European Pat. Off. |
| 0551944 | 7/1993 | European Pat. Off. |
| WO89/10615 | 11/1989 | WIPO |

OTHER PUBLICATIONS

Patent Abstracts Of Japan, vol. 25, No. 30 (P–1157) 24 Jan. 1991, JP–A–02 270 187 (Sony Corp.) 5 Nov. 1990, US–A–5210659 (Publ. Nov. 5, 1993) *abstract.
Patent Abstracts Of Japan, vol. 9, No. 291 (E–359) (2014) 19 Nov. 1985, JP=A–60 130 276 (Ricoh K.K.) 11 Jul. 1985 *abstract.
Patent Abstract Of Japan vol. 13, No. 256 (P–884) 14 Jun. 1989, JP–A–01 053 392 (Canon Inc.) 1 Mar. 1989 *abstract.
Research Disclosure, vol. 2244, No. 330, Oct. 1991, Havant GB, XP265009 'Recording Of Information On A Cassette Reel' Article Nr. 33038.

*Primary Examiner*—Thai Q. Tran
*Assistant Examiner*—Khoi Truong
*Attorney, Agent, or Firm*—William S. Frommer; Alvin Sinderbrand

[57] ABSTRACT

Apparatus and method for recording in selectable recording modes, track number data and information signals in recording tracks on a recording medium, in which the track number of a track in which an information signal is recorded is determined by utilizing a ratio of a track pitch produced when a first recording mode is selected and a track pitch produced when a second recording mode is selected.

49 Claims, 18 Drawing Sheets

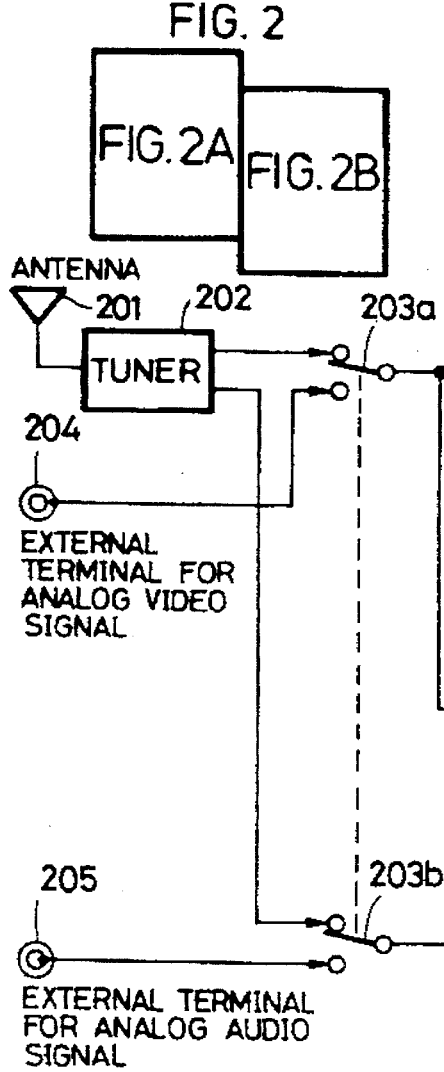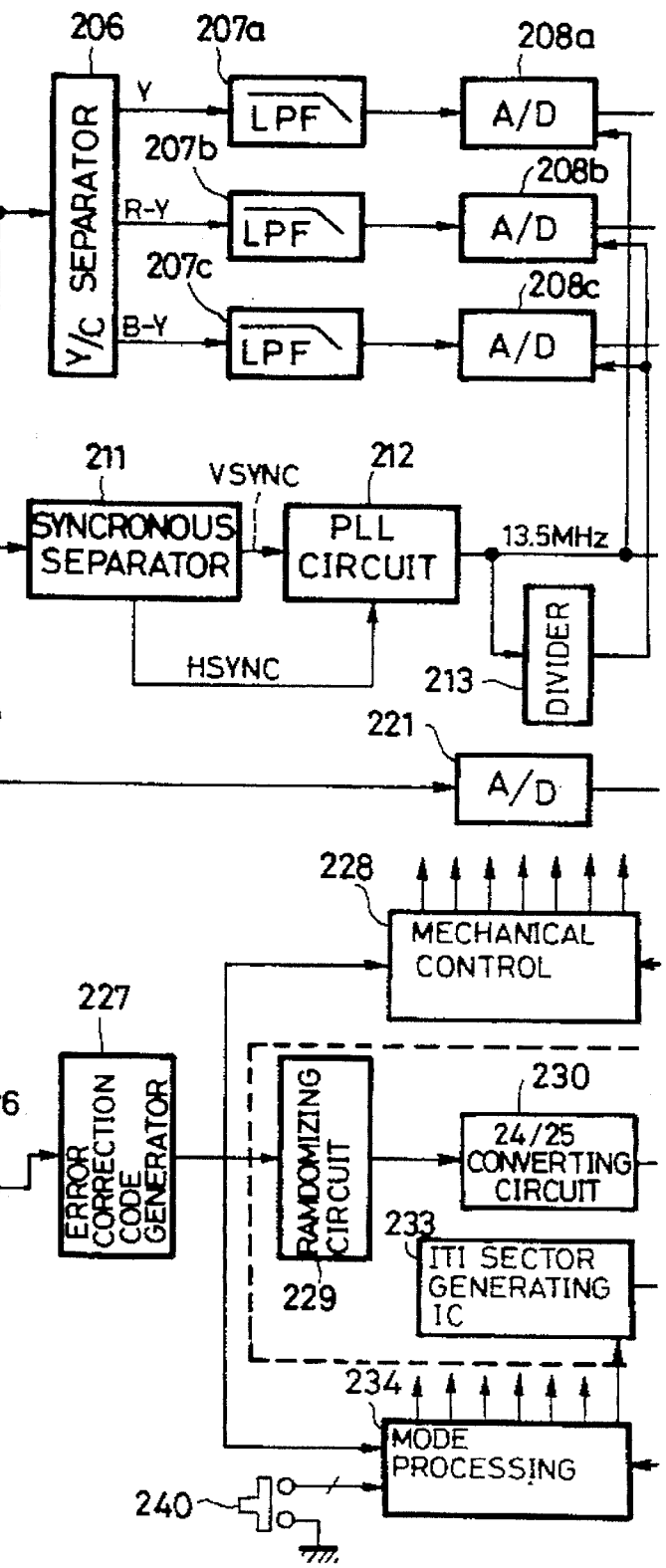
FIG. 2A

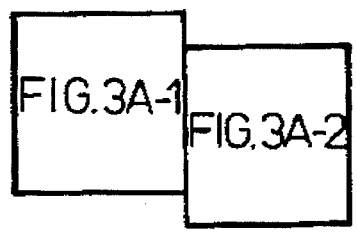
FIG. 3A
FIG. 3A-1
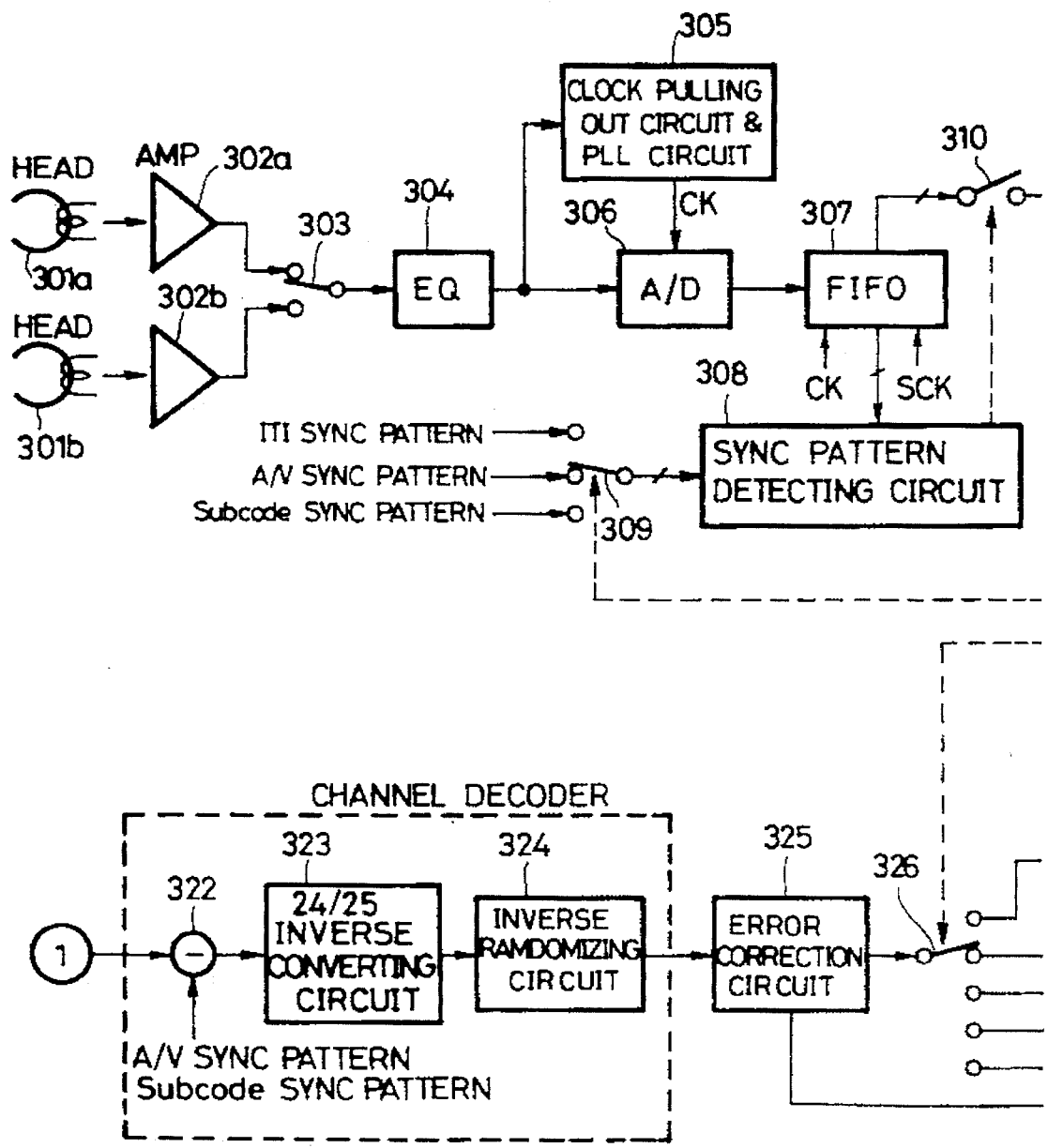

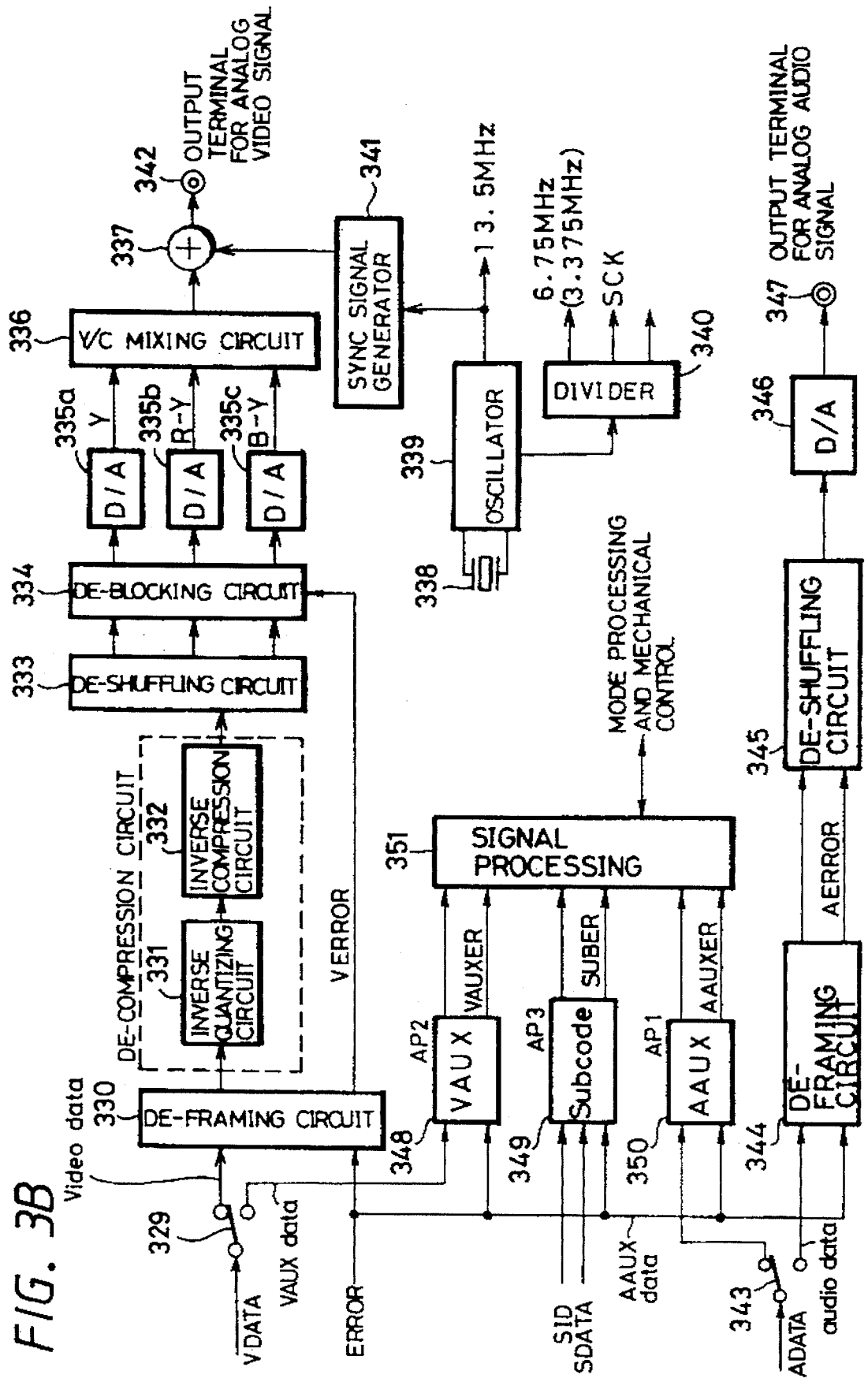

FIG. 5

| | 2 Byte | | 3 Byte | | | 5 Byte | 2 Byte | |
|---|---|---|---|---|---|---|---|---|
| | SYNC | SYNC | ID0 | ID1 | IDP | Subcode Data | Parity | Parity |
| SYNC No. 0 | | | PR<br>AP3 2<br>AP3 1<br>AP3 0<br>Tr. No16<br>Tr. No17<br>Tr. No18<br>Tr. No19 | Tr. No20<br>Tr. No21<br>Tr. No22<br>BF<br>SYNC 3<br>SYNC 2<br>SYNC 1<br>SYNC 0 | | OPTIONAL | | |
| SYNC No. 1 | | | PR<br>RSV<br>RSV<br>RSV<br>Tr. No 8<br>Tr. No 9<br>Tr. No10<br>Tr. No11 | Tr. No12<br>Tr. No13<br>Tr. No14<br>Tr. No15<br>SYNC 3<br>SYNC 2<br>SYNC 1<br>SYNC 0 | | OPTIONAL | | |
| SYNC No. 2 | | | PR<br>RSV<br>RSV<br>RSV<br>Tr. No 0<br>Tr. No 1<br>Tr. No 2<br>Tr. No 3 | Tr. No 4<br>Tr. No 5<br>Tr. No 6<br>Tr. No 7<br>SYNC 3<br>SYNC 2<br>SYNC 1<br>SYNC 0 | | OPTIONAL | | |
| SYNC No. 3 | | | PR<br>RSV<br>RSV<br>RSV<br>Tr. No16<br>Tr. No17<br>Tr. No18<br>Tr. No19 | Tr. No20<br>Tr. No21<br>Tr. No22<br>BF<br>SYNC 3<br>SYNC 2<br>SYNC 1<br>SYNC 0 | | Main area | | |
| SYNC No. 4 | | | PR<br>RSV<br>RSV<br>RSV<br>Tr. No 8<br>Tr. No 9<br>Tr. No10<br>Tr. No11 | Tr. No12<br>Tr. No13<br>Tr. No14<br>Tr. No15<br>SYNC 3<br>SYNC 2<br>SYNC 1<br>SYNC 0 | | Main area | | |
| SYNC No. 5 | | | PR<br>RSV<br>RSV<br>RSV<br>Tr. No 0<br>Tr. No 1<br>Tr. No 2<br>Tr. No 3 | Tr. No 4<br>Tr. No 5<br>Tr. No 6<br>Tr. No 7<br>SYNC 3<br>SYNC 2<br>SYNC 1<br>SYNC 0 | | Main area | | |
| SYNC No. 6 | | | PR<br>AP3 2<br>AP3 1<br>AP3 0<br>Tr. No16<br>Tr. No17<br>Tr. No18<br>Tr. No19 | Tr. No20<br>Tr. No21<br>Tr. No22<br>BF<br>SYNC 3<br>SYNC 2<br>SYNC 1<br>SYNC 0 | | OPTIONAL | | |
| SYNC No. 7 | | | PR<br>RSV<br>RSV<br>RSV<br>Tr. No 8<br>Tr. No 9<br>Tr. No10<br>Tr. No11 | Tr. No12<br>Tr. No13<br>Tr. No14<br>Tr. No15<br>SYNC 3<br>SYNC 2<br>SYNC 1<br>SYNC 0 | | OPTIONAL | | |
| SYNC No. 8 | | | PR<br>RSV<br>RSV<br>RSV<br>Tr. No 0<br>Tr. No 1<br>Tr. No 2<br>Tr. No 3 | Tr. No 4<br>Tr. No 5<br>Tr. No 6<br>Tr. No 7<br>SYNC 3<br>SYNC 2<br>SYNC 1<br>SYNC 0 | | OPTIONAL | | |
| SYNC No. 9 | | | PR<br>RSV<br>RSV<br>RSV<br>Tr. No16<br>Tr. No17<br>Tr. No18<br>Tr. No19 | Tr. No20<br>Tr. No21<br>Tr. No22<br>BF<br>SYNC 3<br>SYNC 2<br>SYNC 1<br>SYNC 0 | | Main area | | |
| SYNC No. 10 | | | PR<br>RSV<br>RSV<br>RSV<br>Tr. No 8<br>Tr. No 9<br>Tr. No10<br>Tr. No11 | Tr. No12<br>Tr. No13<br>Tr. No14<br>Tr. No15<br>SYNC 3<br>SYNC 2<br>SYNC 1<br>SYNC 0 | | Main area | | |
| SYNC No. 11 | | | PR<br>APT 2<br>APT 1<br>APT 0<br>Tr. No 0<br>Tr. No 1<br>Tr. No 2<br>Tr. No 3 | Tr. No 4<br>Tr. No 5<br>Tr. No 6<br>Tr. No 7<br>SYNC 3<br>SYNC 2<br>SYNC 1<br>SYNC 0 | | Main area | | |

SUBCODE

FIG. 6

| Sync block No. | MSB | | | ID0 | | | | | | | | LSB MSB | | | | | | | ID1 | | | | LSB |
|---|---|---|---|---|---|---|---|---|---|---|---|---|---|---|---|---|---|---|---|---|---|---|---|
| 0 | FR | AP32 | AP31 | AP30 | | | | | | | | | | | | | | BF | SB3 | SB2 | SB1 | SB0 |
| 1 | FR | | RSV | | | | | | | Absolute track No. | | | | | | | LSB | | SB3 | SB2 | SB1 | SB0 |
| 2 | FR | | RSV | | MSB | | | | | Absolute track No. | | | | | | | | | SB3 | SB2 | SB1 | SB0 |
| 3 | FR | | RSV | | | | | | | Absolute track No. | | | | | | | BF | | SB3 | SB2 | SB1 | SB0 |
| 4 | FR | | RSV | | MSB | | | | | Absolute track No. | | | | | | | LSB | | SB3 | SB2 | SB1 | SB0 |
| 5 | FR | | RSV | | | | | | | Absolute track No. | | | | | | | | | SB3 | SB2 | SB1 | SB0 |
| 6 | FR | AP32 | AP31 | AP30 | | | | | | | | | | | | | BF | | SB3 | SB2 | SB1 | SB0 |
| 7 | FR | | RSV | | MSB | | | | | Absolute track No. | | | | | | | LSB | | SB3 | SB2 | SB1 | SB0 |
| 8 | FR | | RSV | | | | | | | Absolute track No. | | | | | | | | | SB3 | SB2 | SB1 | SB0 |
| 9 | FR | | RSV | | MSB | | | | | Absolute track No. | | | | | | | BF | | SB3 | SB2 | SB1 | SB0 |
| 10 | FR | | RSV | | | | | | | Absolute track No. | | | | | | | LSB | | SB3 | SB2 | SB1 | SB0 |
| 11 | FR | APT2 | APT1 | APT0 | MSB | | | | | Absolute track No. | | | | | | | | | SB3 | SB2 | SB1 | SB0 |

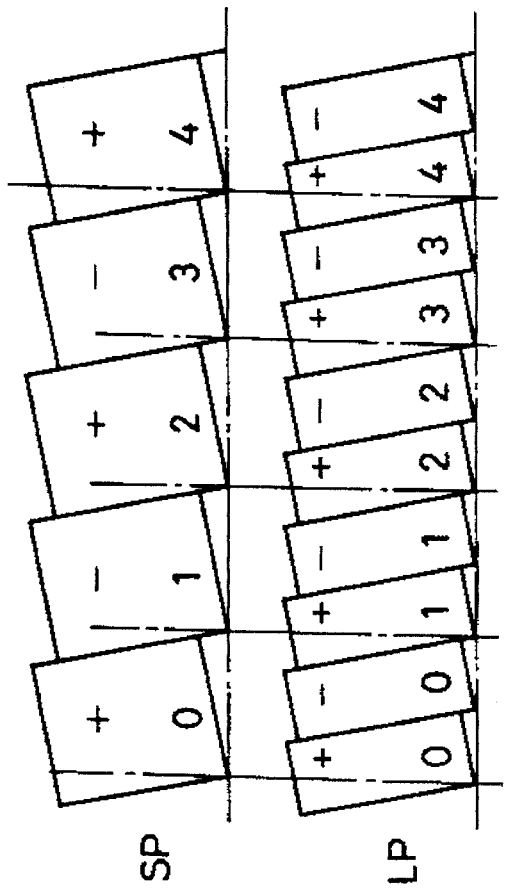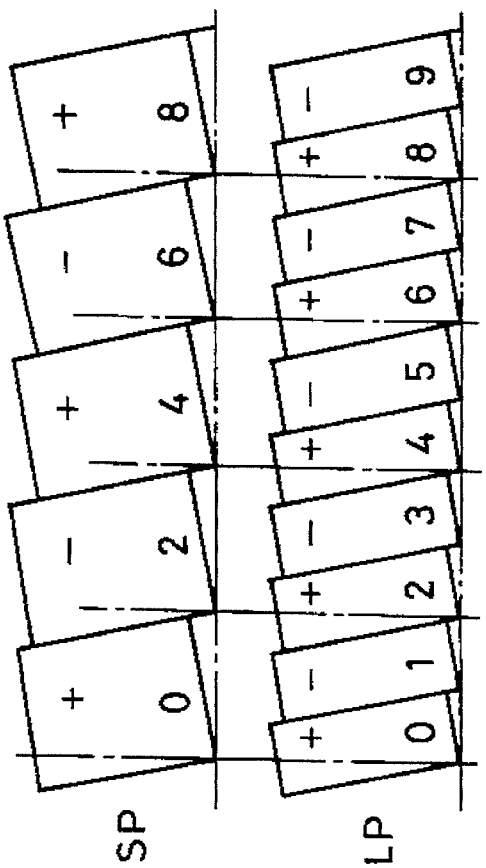
FIG. 11A  
FIG. 11B  
FIG. 11C  
FIG. 11D

APPARATUS AND METHOD FOR RECORDING AND REPRODUCING A DIGITAL VIDEO AND AUDIO SIGNAL

BACKGROUND OF THE INVENTION

The present invention relates to a digital video tape recorder and, more particularly, to apparatus for recording a track number along with the digital video and audio signal on a recording track on a recording medium.

Video tape recorders (VTR) for both consumer use and professional use record a time-code in addition to the audio and video signals. The time code typically is a numerical value representing the hour, minute, second and field/frame of recording of the video and audio signals that it accompanies and is employed to detect a desired position on a tape as during a high-speed searching mode. When video and audio signals are recorded, the time code of the preceding signal usually is detected and a new time code which is contiguous with the detected time code is generated and compared to the next-recorded time code, for example, for error detection.

One problem encountered with the above-described video tape recorders is the general inability to ascertain the absolute track number of the magnetic tape when video and audio signals are recorded in different recording modes. Video tape recorders (VHS, BETA, 8 mm etc) are capable of recording a video and audio signal in a standard play (SP) recording mode and a long play (LP) recording mode. An extended play (EP) recording mode is also available in many video tape recorders. When video and audio signals are recorded in different recording modes on the same magnetic tape, two tracks may be identified by the same time code. FIG. 1A illustrates the tracks formed on a magnetic tape recorded in SP mode with their corresponding time codes. Tracks are formed obliquely on a magnetic tape but are shown perpendicularly across the tape to simplify the drawings.

Figures 1A, 1B:
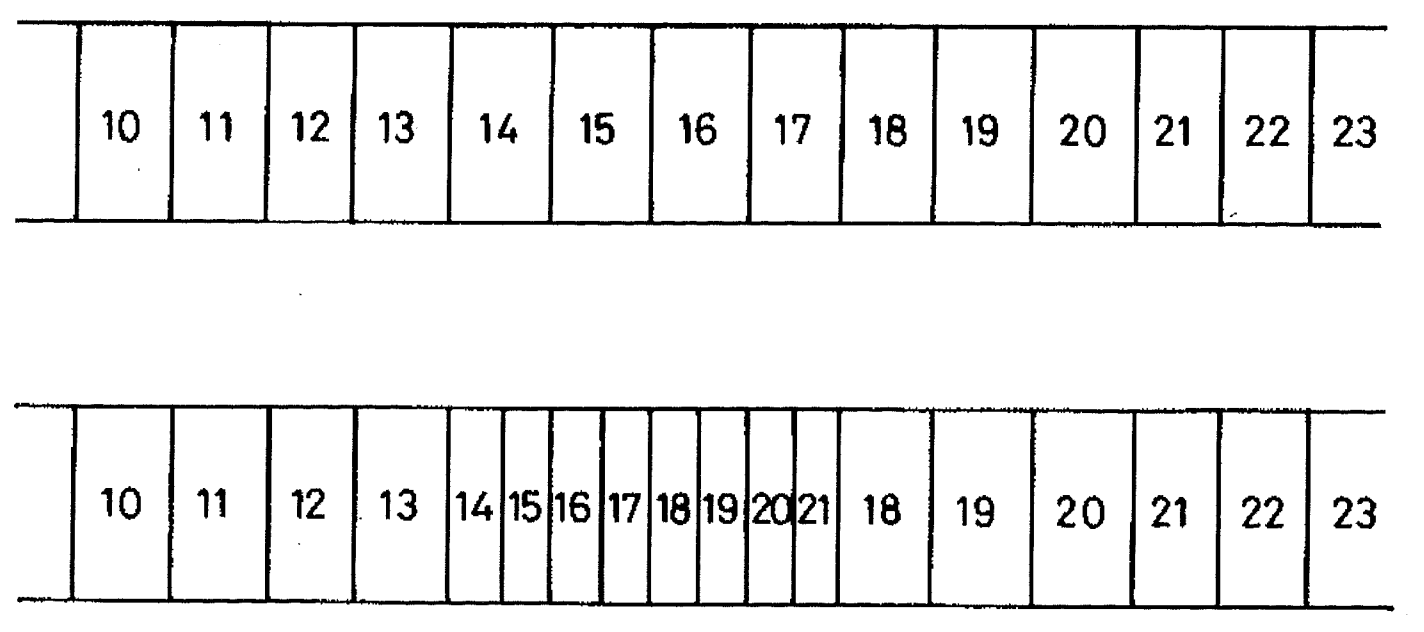

FIG. 1B illustrates the magnetic tape when a portion of the tape shown in FIG. 1A is re-recorded (overwritten) with video and audio signals in LP mode. As shown, tracks 10–13 are recorded in SP mode and subsequent tracks 14–21 are recorded in LP mode. Tracks formed in LP mode are narrower than tracks formed in SP mode, and as a result, LP mode tracks 18–21 have the same time code as following SP mode tracks 18–21 that had been previously recorded. Therefore, several time codes are recorded twice on the same magnetic tape and such time codes cannot serve as absolute indicators of the tape position.

To overcome this problem, there is a known process of determining the remaining recording length of a tape such as disclosed in Japanese Patent Publication No. 1-15955, from which absolute tape position can be determined. According to the disclosed process, the length of the tape is calculated as a function of the measured diameter of the tape wound on a reel (e.g. the take-up reel), the diameter of the hub of the reel, the thickness of the tape, the rotational velocity of the supply reel and the tape travelling speed.

One difficulty encountered in a typical video tape recorder using the above-described process is the general inability to calculate the exact remaining length of the tape because of the existence of winding irregularities, various thicknesses of air layers between the layers of the tape on the reel and the fact that the tape may be wound under different conditions during the course of operation (for example, the tape may be wound during SP playback mode, LP playback mode, CUE/REV mode and fast forward mode). Hence, this process provides merely an approximation of the remaining length of tape.

Another difficulty with video tape recorders using the above-described process is that the tape supply reel must make several rotations before the length of the tape can be calculated. This process adds several seconds to the entire process of inserting a tape into the video tape recorder, lowering the cassette holder, loading the tape, calculating the remaining tape and indicating the remaining time. In addition, when the remaining tape recording time of several tapes is desired, several additional steps are necessary including depressing the eject button, unloading the tape, lifting the cassette holder and removing the tape cassette before a new tape cassette is inserted. This fairly complex procedure requires about 10 seconds (and varies depending upon whether the takeup reel or the supply reel contains more tape) to determine the remaining tape recording time of a single magnetic tape.

OBJECTS OF THE INVENTION

Therefore, it is an object of the present invention to provide an apparatus and method for recording and reproducing digital video and audio signals which overcome the shortcomings of the above described devices.

Another object of the present invention to provide an apparatus and method for recording and reproducing signals on tracks which ascertain the absolute track number of each recording track on a magnetic tape.

A further object of the present invention is to provide a recording and reproducing technique which ascertains the absolute track number of each track that is recorded without any absolute track number being recorded twice on the same magnetic tape.

An additional object of this invention is to provide a technique which calculates the exact remaining length of time of a magnetic tape.

Still another object of the present invention is to provide an apparatus and method for recording and reproducing digital video and audio signals which calculate the exact remaining length of time on a magnetic tape without having to rotate the tape supply reel or to load the tape in the video tape recorder to do so.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, the track number of the track in which an information signal (e.g. audio signal, video signal and track number) is recorded (e.g. as a coded signal) is determined by utilizing a ratio (e.g. of 2:1, 3:2) of a track pitch produced when a first recording mode is selected and a track pitch produced when a second recording mode is selected.

As one aspect of this invention, the track number of the newly recorded track is determined by increasing the track number of the preceding track by the numerator of the aforementioned ratio when the preceding track was recorded in the first recording mode and by the denominator of this ratio when the preceding track was recorded in the second recording mode.

As another aspect of this invention, a final track number corresponding to the end of the recording medium is ascertained, as by reproducing the final track number stored in a memory (i.e. random access memory) located in a housing of the recording medium, and the amount of recording time remaining on the recording medium is determined by utilizing the final track number and the track number of the track currently being processed (i.e. recorded or reproduced).

As a feature of this aspect, the final track number and the current track number are stored in a memory (i.e. random access memory) associated with the recording medium.

As another feature of this aspect, the apparatus further comprises a remote control unit, wherein the remote control unit is supplied with the final track number and the current track number from memory and determines the amount of recording time remaining on the recording medium.

As yet a further aspect of this invention, the track number of the newly recorded track is determined by decreasing the track number of a preceding track by a numerator of the aforementioned ratio when the preceding track was recorded in the first recording mode and by a denominator of this ratio when the preceding track was recorded in the second recording mode.

As a feature of this aspect, the first track at the beginning of the recording medium contains a predetermined track number which is the maximum number of tracks that can be recorded on the entire recording medium.

As another feature of this aspect, the track number of the first track at the beginning of the recording medium is ascertained by reproducing a predetermined track number from a memory located in a housing of the recording medium, the predetermined track number being the maximum number of tracks that can be recorded on the entire recording medium.

As yet a further feature of this aspect, an amount of recording time remaining on the recording medium is ascertained by utilizing a current track number (i.e. the determined track number).

As yet another aspect of this invention, the track number and information signal (e.g. video and audio signal) are capable of being reproduced from the recording medium.

As a feature of this aspect, the recording medium comprises a tape housed within a cassette and a predetermined final track number stored in a memory (i.e. random access memory) located in or on the cassette is reproduced and the amount of recording time remaining on the recording medium is ascertained by utilizing the final track number and track number of the track currently being processed (i.e. recorded or reproduced).

As a feature of this feature, the apparatus further comprises a remote control unit, wherein the remote control unit is supplied with the final track number and the current track number from the aforementioned memory and determines the amount of recording time remaining on the recording medium.

In accordance with another embodiment of the present invention, the track number of a track in which an information signal is recorded is ascertained by incrementing the track number of the preceding track for each new track recorded in a first recording mode and by incrementing the track number of the preceding track for each alternate track recorded in a second recording mode, the track pitch of the first recording mode being twice the track pitch of the second recording mode. The track number is recorded on and reproduced from the recording track along with the information signal. Adjacent recording tracks have different azimuth angles and a recording track is identified by the track number when the first recording mode is used and is identified by the track number and the azimuth angle of that track when the second recording mode is used.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 1A and 1B are schematic illustrations of recording tracks and their time codes in conventional video tape recorders;

FIGS. 3A and 3B are block diagrams of the reproducing portion of a digital video tape recorder in accordance with the present invention.

FIG. 5 schematically illustrates the data structure of the subcode area of a track shown in FIG. 4;

FIG. 6 schematically illustrates the data structure of Bytes ID0 and ID1 of the subcode sync areas shown in FIG. 5;

FIGS. 7A to 7C schematically illustrate the recording tracks when SP mode tracks are overwritten with LP mode tracks in accordance with the present invention (with the ratio of the track pitch of SP mode to LP mode being 2:1);

FIGS. 8A to 8C schematically illustrate the recording tracks when LP mode tracks are overwritten with SP mode tracks in accordance with the present invention (with the ratio of the track pitch of SP mode to LP mode being 2:1);

FIGS. 9A to 9C schematically illustrate the recording tracks when SP mode tracks are overwritten with LP mode tracks in accordance with the present invention (with the ratio of the track pitch of SP mode to LP mode being 3:2);

FIGS. 11A to 11D illustrate recording tracks recorded in SP and LP modes using the azimuth angles of the recording tracks to identify the track;

DETAILED DESCRIPTION OF CERTAIN PREFERRED EMBODIMENTS

Figure 2B:
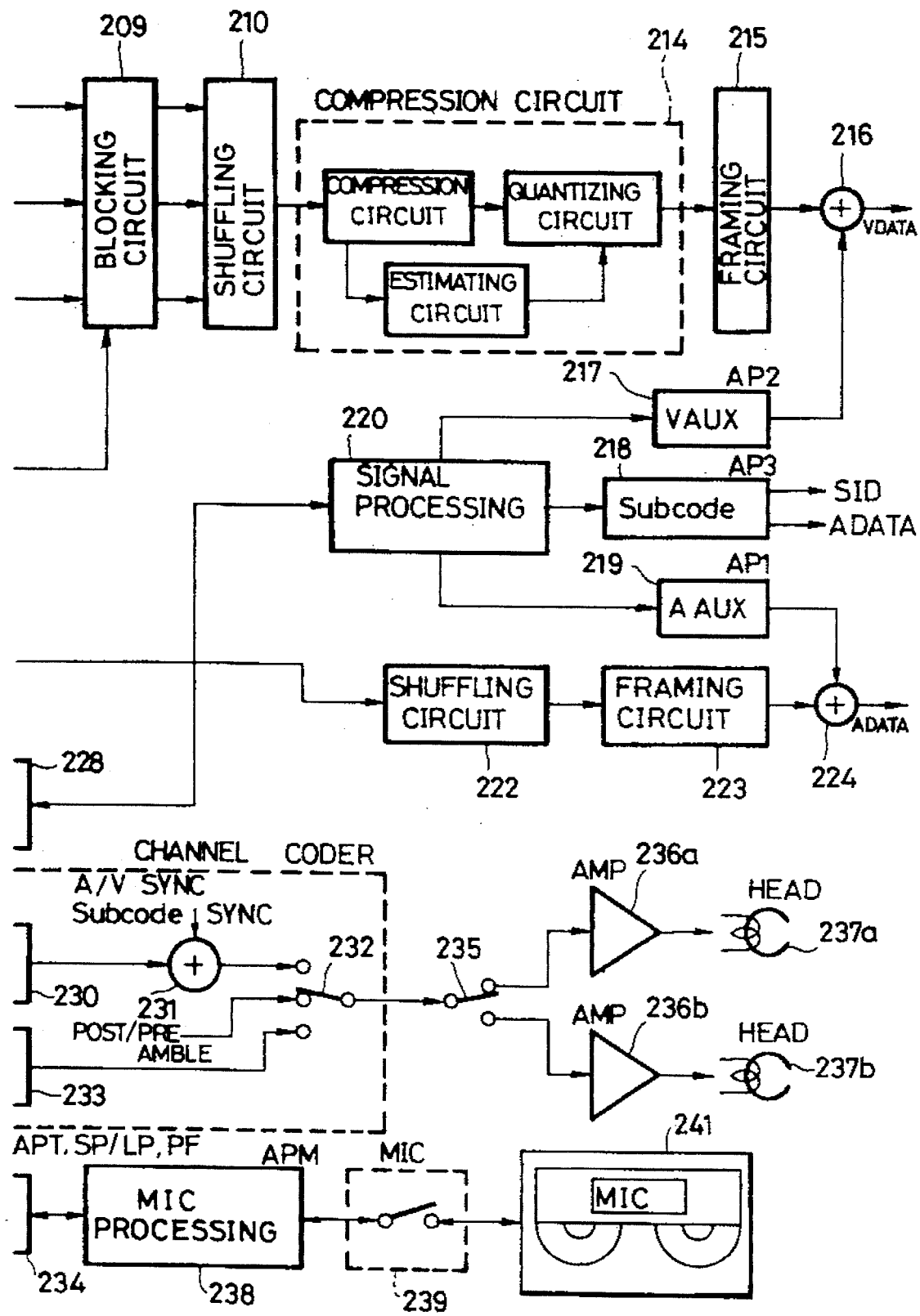
FIG. 2 is a block diagram of the recording portion of a digital video tape recorder in accordance with the present invention.
Figures 2, 3A:
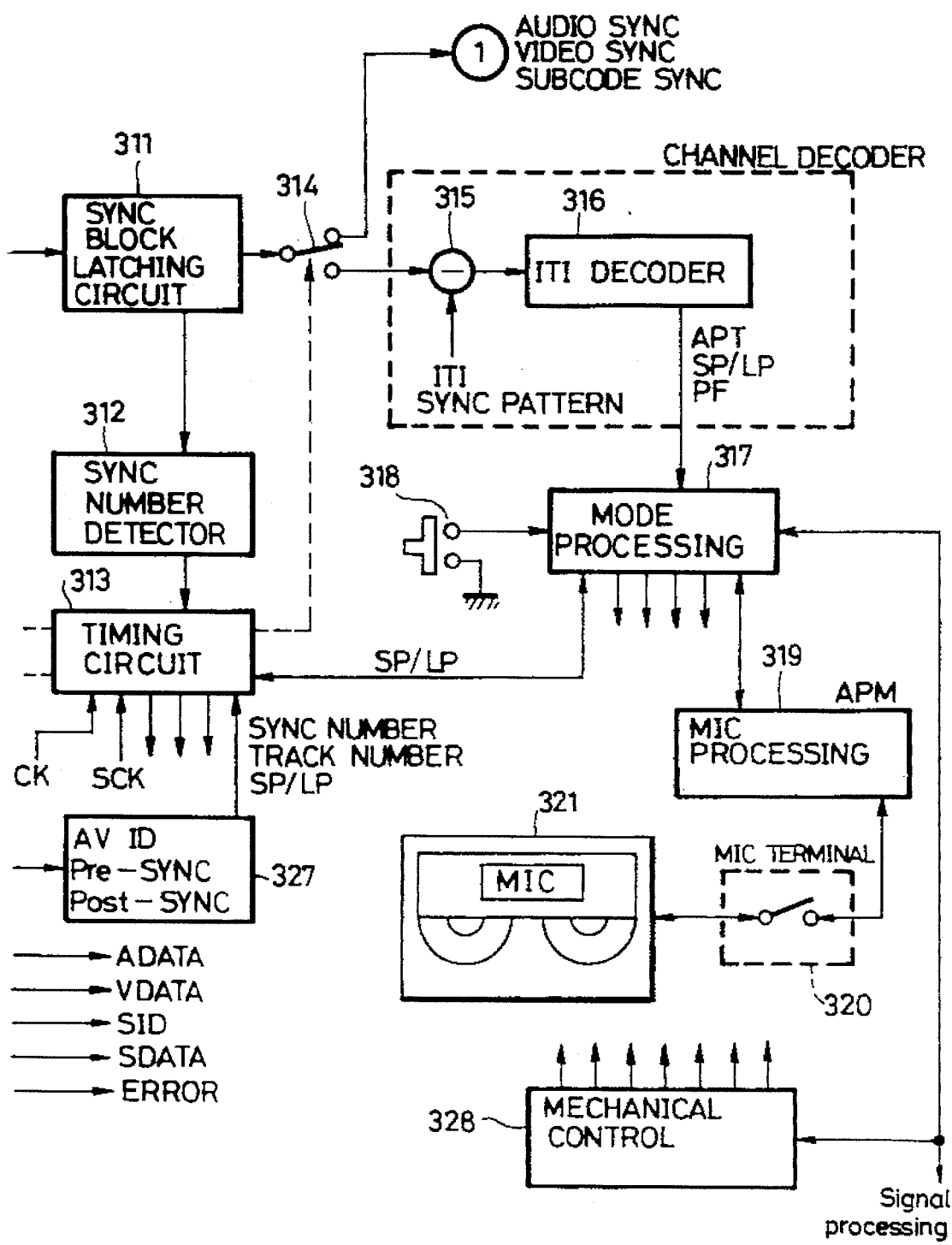

Referring now to the drawings, FIGS. 2, 3A and 3B show the overall arrangement of a video tape recorder which incorporates the present invention. FIGS. 2, 3A and 3B are described in U.S. application Ser. No. 08/159,455, filed Nov. 30, 1993 (Attorney File No. 450100-2906), the disclosure of which is incorporated herein by reference.

Figure 4A:
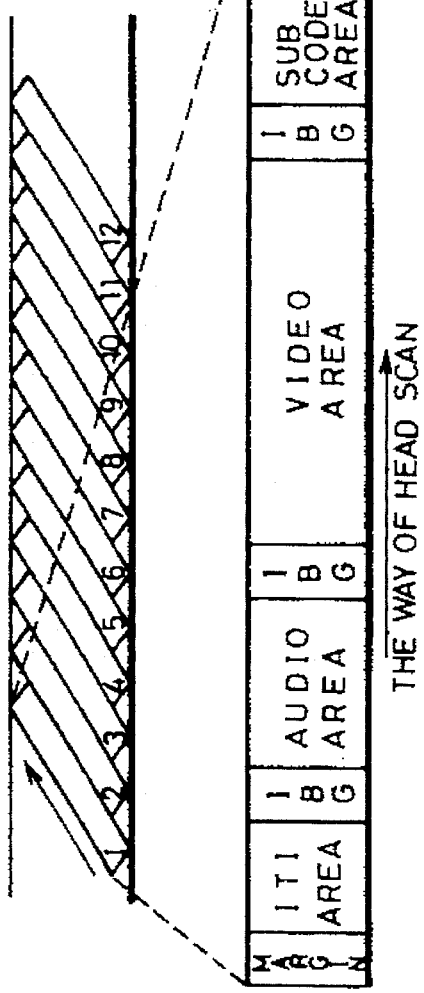
FIGS. 4A to 4E are diagrams showing the format of various portions of the coded signal recorded on and reproduced from the magnetic tape used by the present invention.
Figure 4B:
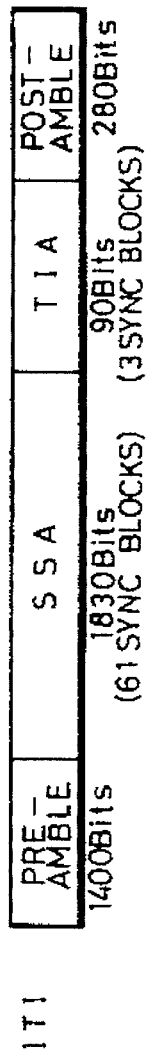
Figure 4C:
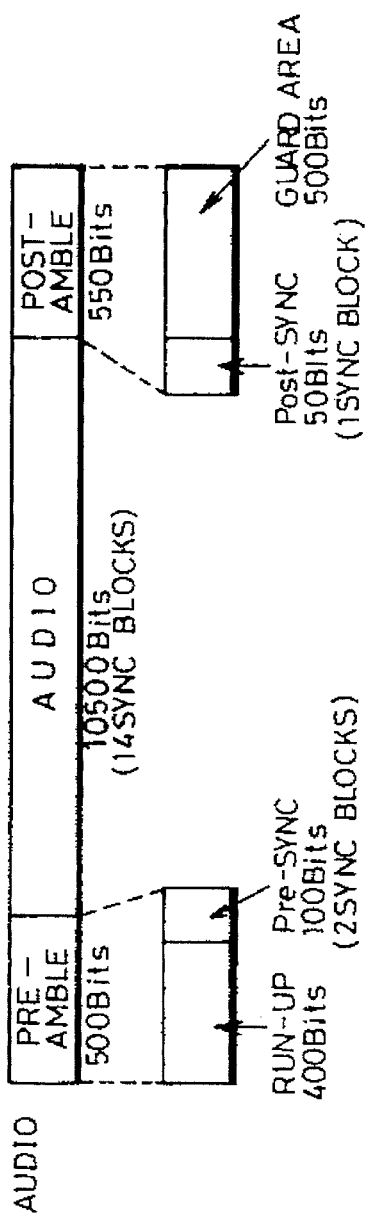
Figure 4D:
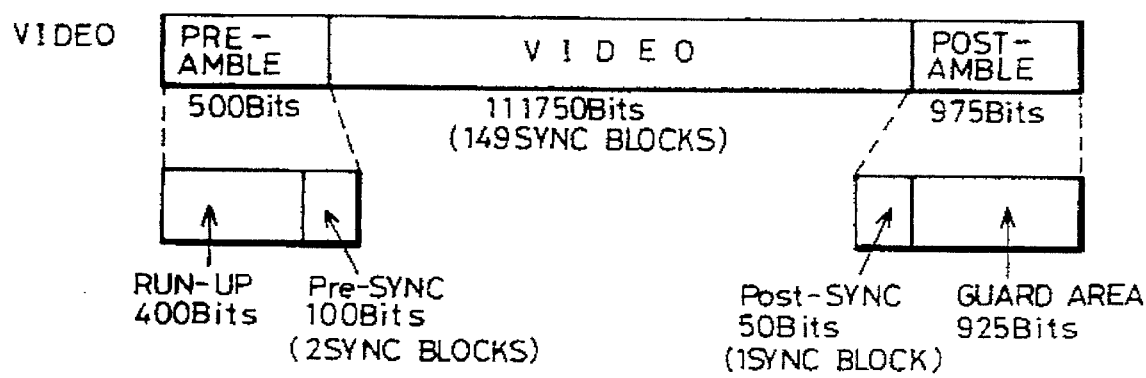
Figure 4E:
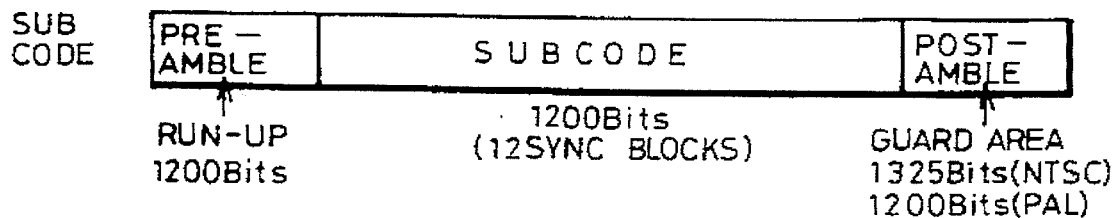

FIG. 4A shows a recording format of one track recorded by the apparatus shown in FIG. 2. In a preferred embodiment of the digital video tape recorder, 10 tracks are recorded and reproduced in a single frame of image data in the NTSC system and 12 tracks are recorded and reproduced in a single frame of image data in the PAL system. As shown in FIG. 4A, margins for edit operations that may be performed subsequently are provided at respective ends of the track. During recording of one track, an insert and track information (ITI) area is recorded followed by audio, video and subcode areas. Between adjacent ones of these four recorded areas, inter block gaps (IBG) are formed. As shown in FIGS. 4B to 4E, the ITI, audio, video and subcode areas each contains a pre-amble area at the beginning and a post-amble area at the end of the respective area. The pre-amble and post-amble areas prevent data from remaining unerased when re-recording of new data occurs. The ITI, audio, video and subcode areas are further described in U.S. application Ser. No. 08/159,455, (Attorney File No. 450100-2906).

The subcode area in one recording track is described with reference to FIG. 5. In one particular example, the subcode area contains 12 successive synchronization (sync) blocks identified by Sync Nos. 0–11. Each subcode sync block contains a 5 byte sync area, a 5 byte data area and 2 bytes of error correction code (such as parity).

The 5 byte sync area has 2 sync bytes and 3 identification bytes ID0, ID1 and IDP. Identification bytes ID0 and ID1 represent absolute track number Tr, frame ID signal FR, application ID bits AP3 and APT, blank flag BF and the subcode sync block number.

In one numerical example, absolute track number Tr is 23 bits long, is distributed over several sync blocks and is repeated so as to provide redundant track number data. The absolute track number data identifies the track number of each track. Track number data Tr is stored as segments in bytes ID0 and ID1 as bits Tr. No.0 through Tr. No.22 in successive subcode sync block nos. 0–2 and is stored three additional times in sync block nos. 3–11 to allow for reliable reproduction of the stored track number during high-speed playback or search mode. As shown in FIG. 6, the track number data extends through 3 sync blocks where the most significant bit (MSB) of the track number data is located at the fifth most significant bit of byte ID0 in sync block number 2 (and repeated at the fifth most significant bit of byte IDO in sync block numbers 5, 8 and 11) and the least significant bit (LSB) of the track number data is located at the third most significant bit of byte ID1 in sync block number 0 (and repeated at the third most significant bit of byte ID1 in sync block numbers 3, 6, and 9). In addition, blank flag BF is one bit long and identifies whether absolute track number Tr is continuous or discontinuous. That is, BF=1 when there is continuous recording on the tape, i.e. the absolute track number is not approximated. BF=0 when recording is discontinuous, i.e. a preceding portion of the tape is blank. When BF=0, the stored absolute track number is estimated and is further described below. Bit BF is repeated 4 times and is stored at the fourth most significant bit in subcode sync block nos. 0, 3, 6 and 9.

The remaining signals stored in the subcode area of a track are described in U.S. application Ser. No. 08/159,455, (Attorney File No. 450100-2906).

The generation of the absolute track numbers of the video tape recorder of the present invention will now be described. Let it be assumed that the ratio of the track pitch recorded in SP mode to the track pitch recorded in LP mode is 2:1. For example, the track pitch of a track recorded in SP mode may be 10 μm and the track pitch of a track recorded in LP mode may be 5 μm. During recording in SP mode, tracks are assigned track numbers that are multiples of 2 and during recording in LP mode, tracks are assigned track numbers that are multiples of 1. That is, a track number in SP mode=2×N, a track number in LP mode=1×N, where N=0, 1, 2, 3, . . .

In addition, to determine the track number of a specified track during recording, the track number of the previous track is incremented by 2 during SP mode and incremented by 1 during LP mode.

In one embodiment of the present invention, the track number of the previous track is stored in a memory in the video tape recorder if the previous track had just been recorded. If the track number of the previous track is not stored in the video tape recorder's memory, for example, when the tape cassette had just been loaded into the video tape recorder, then the track number is ascertained by reproducing the previous track on the tape.

During playback, the track number is reproduced from the track. When the track number cannot be ascertained from the reproduced information (e.g. when the track number is approximated as described below or when the reproduced information does not contain the track number), it is necessary for the video tape recorder of the present invention to determine the track number of the reproduced track by utilizing the above described method of determining the track number during recording (i.e. incrementing the track number of the previous track).

However, it may be necessary to estimate the track number of a specified track when the track number cannot be ascertained using the above described processes. For example, a tape may be loaded into the video tape recorder of the present invention which does not contain track number information and the tape is not at its beginning position. In this instance, the video tape recorder of the present invention will "estimate" the track number of the current track by utilizing any one of a variety of methods that are known in the art. Then, when the track number is estimated and subsequently recorded, bit BF=0 is recorded as discussed above.

In another embodiment of the present invention, let it be assumed that the ratio of the track pitches recorded in SP and LP modes is 3:2. For example, the track pitch of a track recorded in SP mode may be 9 μm and the track pitch of a track recorded in LP mode may be 6 μm. During recording in SP mode, tracks are assigned track numbers that are multiples of 3 and during recording in LP mode, tracks are assigned track numbers that are multiples of 2. That is, a track number in SP mode=3×N, a track number in LP mode=2×N, where N=0, 1, 2, 3, . . .

Further, to determine the track number of a specified track during recording, the track number of the previous track is incremented by 3 during SP mode and incremented by 2 during LP mode. During playback, the track number is ascertained as similarly described above.

The above described track number assignments are schematically illustrated in FIGS. 7–10. In these figures, one frame of image data is recorded in 10 tracks on a record tape, as is the case in the NTSC system. Thick lines indicate division of frames and the numbers in the track represent intra-frame track numbers. Numbers below each track are the assigned absolute track numbers from the beginning of the tape.

Figures 7A, 7B, 7C:
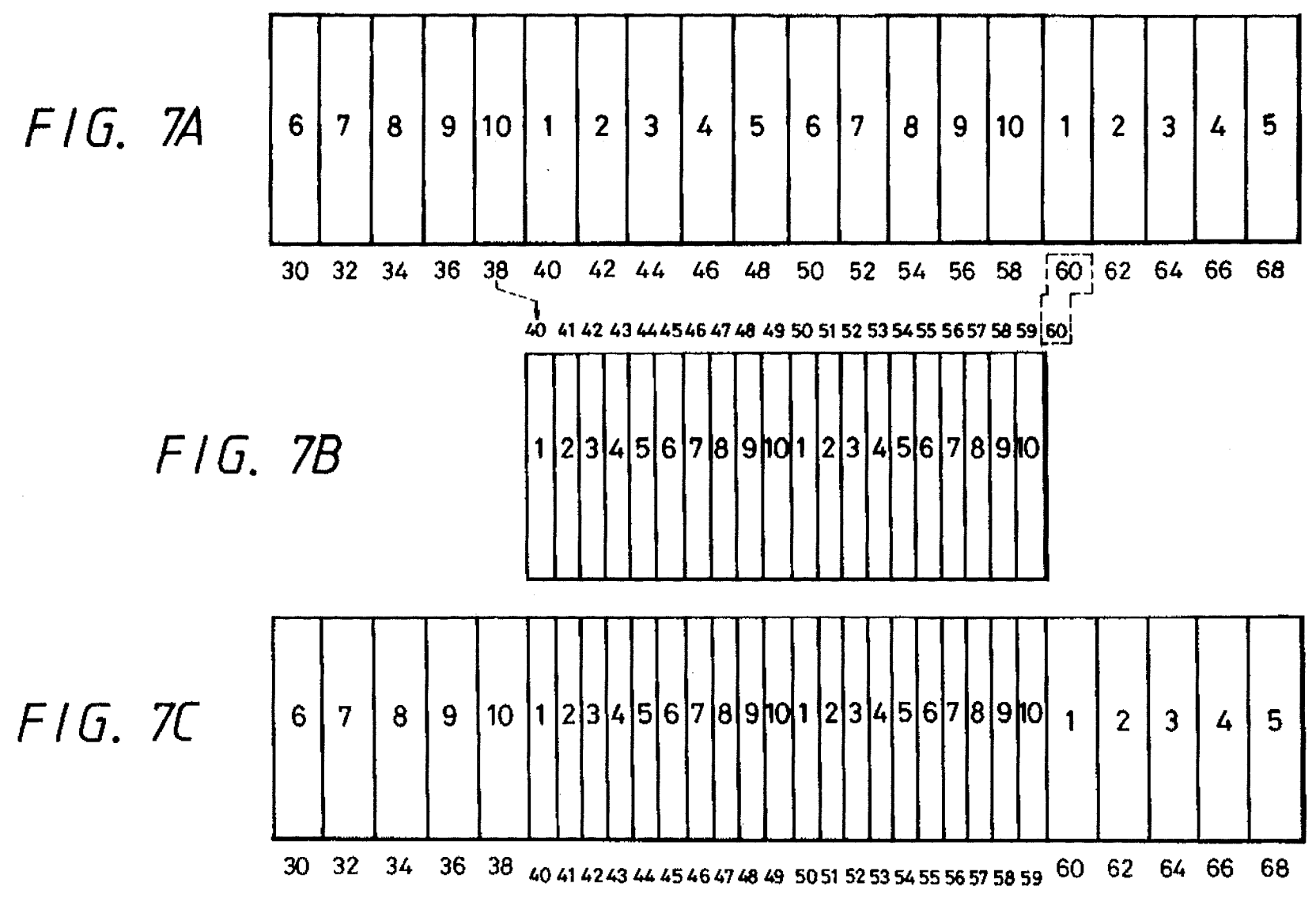

FIGS. 7A, 7B and 7C illustrate the track number assignments when tracks recorded in SP mode (SP tracks) are overwritten with tracks recorded in LP mode (LP tracks) and the ratio of the track pitch in SP mode to the track pitch in LP mode is 2:1. FIG. 7A shows tracks recorded in SP mode. As shown, the tracks have been assigned absolute track numbers 30, 32, 34, 36, . . . 64, 66 and 68 (tracks 0, 2, 4 . . . 28 are not shown). Since the track pitch ratio is 2:1, the absolute track numbers of the tracks recorded in SP mode increment by 2 as described above.

FIG. 7B illustrates two frames of image data recorded in LP mode. These frames are recorded over (over-written) SP recording tracks 40–58. The first LP track is assigned the track number of the immediately preceding track incremented by 2 since the preceding track was recorded in SP mode. The track numbers of the subsequent LP tracks increment by 1. Thus, the 20 LP tracks are assigned track numbers 40–59, respectively. The insertion of the LP tracks over the SP tracks is shown in FIG. 7C. As shown, tracks 30–38 have been recorded in SP mode, tracks 40–59 have been recorded in LP mode and tracks 60–68 have been recorded in SP mode. Thus, a respective track number is assigned to one and only one track.

Returning to FIG. 7A, if the SP tracks were overwritten with only one frame recorded in LP mode (not shown), then the LP tracks would be assigned track numbers 40–49. The next subsequent track after LP track 49 would be SP track 50. Thus, none of the track numbers appear twice. However, tracks 50–58 would not be reproducible since one half of that frame of image data is overwritten with a frame recorded in LP mode.

Figures 8A, 8B, 8C:
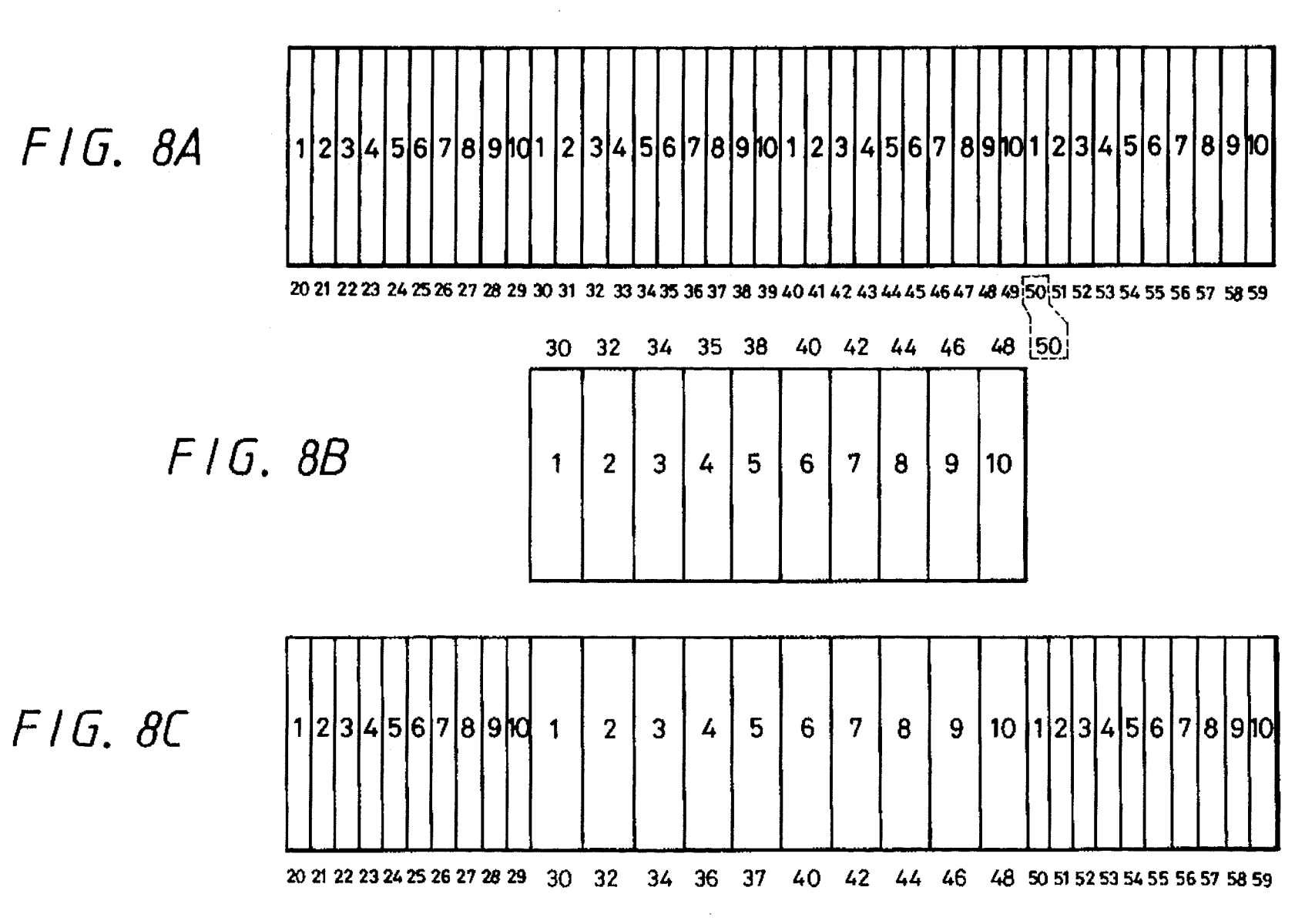

FIGS. 8A, 8B and 8C illustrate the track number assignments when LP tracks are overwritten with SP tracks and the ratio of the track pitch in SP mode to the track pitch in LP mode is 2:1. FIG. 8A shows tracks recorded in LP mode. As shown, the tracks have been assigned absolute track numbers 20, 21, 22 . . . 58 and 59. Since the track pitch ratio is 2:1, the tracks recorded in LP mode increment by 1 as described above.

FIG. 8B illustrates one frame of image data in SP mode. This frame is recorded over LP recording tracks 30–49. The first SP track is assigned track number 30, which is the track number of the previous track incremented by 1 since the previous track was recorded in LP mode. The track numbers of the subsequent SP tracks increment by 2. Thus, the 10 SP tracks are assigned track numbers 30, 32, 34, . . . 48, respectively. The insertion of the SP tracks over the LP tracks is shown in FIG. 8C. As shown, tracks 20–29 are LP tracks, tracks 30–48 are SP tracks and tracks 50–59 are LP tracks. Thus, a respective track number is assigned to one and only one track.

Figures 9A, 9B, 9C:
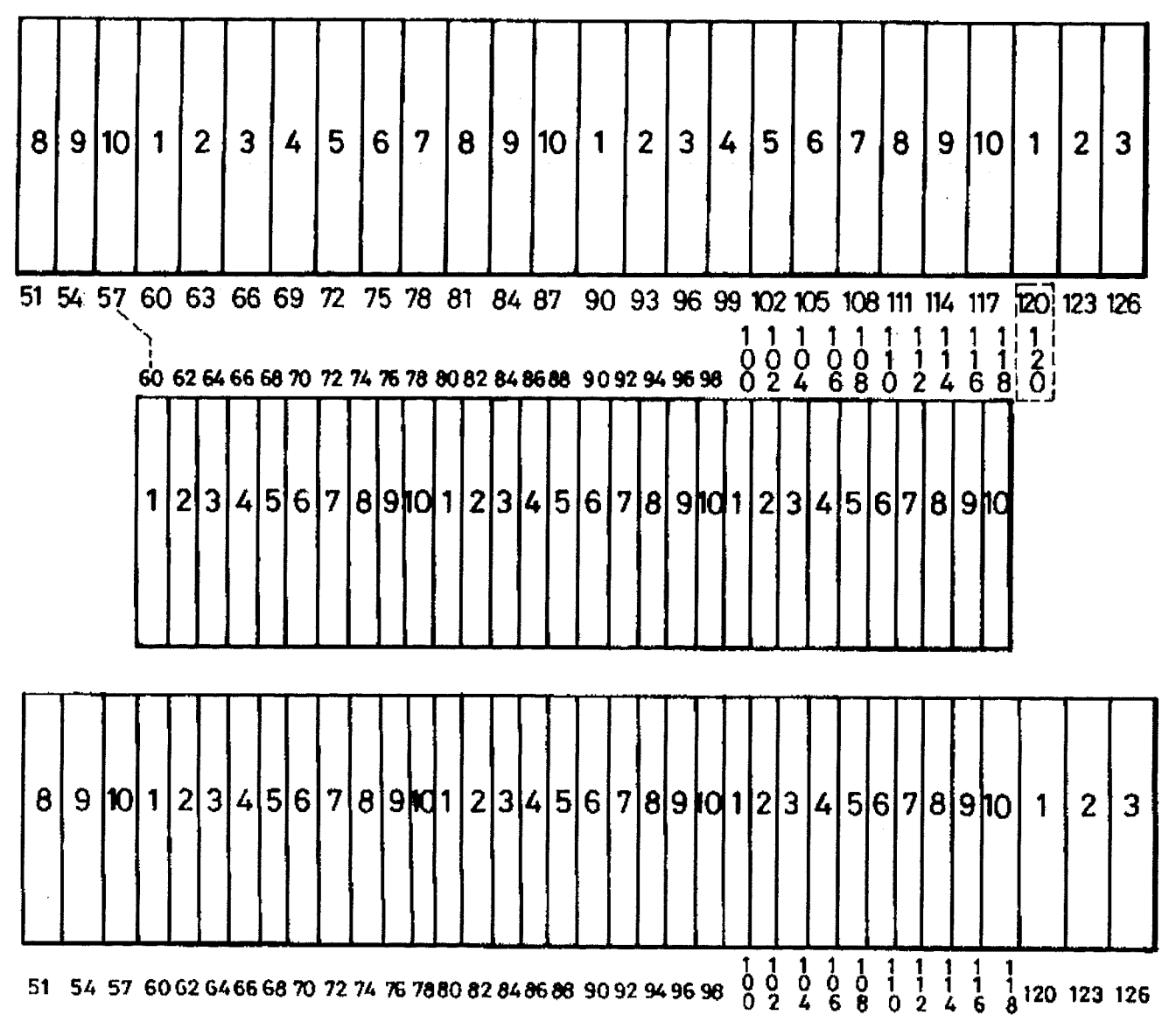

FIGS. 9A, 9B and 9C illustrate the track number assignments when SP tracks are overwritten with LP tracks and the ratio of the track pitch in SP mode to the track pitch in LP mode is 3:2. FIG. 9A shows tracks recorded in SP mode. As shown, the tracks have been assigned absolute track numbers 51, 54, 57, 60 . . . 120, 123 and 126. Since the track pitch ratio is 3:2, the tracks recorded in SP mode increment by 3 as described above.

FIG. 9B illustrates three frames of image data in LP mode. These frames are recorded over SP recording tracks 60–117. The first LP track is assigned the number 60 which is previous track number 57 incremented by 3 since the previous track was recorded in SP mode. The track numbers of the subsequent LP tracks increment by 2. Thus, the 30 LP tracks are assigned track numbers 60, 62, 64 . . . 116 and 118, respectively. The insertion of the LP tracks over the SP tracks is shown in FIG. 9C. As shown, tracks 51, 54 and 57 are SP tracks, tracks 60, 62, 64, . . . 118 are LP tracks and tracks 120, 123 and 126 are SP tracks. Thus, a respective track number is assigned to one and only one track.

Returning to FIG. 9A, if the SP tracks were overwritten with only one frame of LP tracks (not shown), starting at track position 60, then the LP tracks would be assigned track numbers 60, 62, 64 . . . 78. Thus, none of the track numbers are assigned twice. However, image data from SP tracks 81, 84 and 87 would not be reproducible since most of that SP frame is overwritten with a frame recorded in LP mode.

Figure 10A:
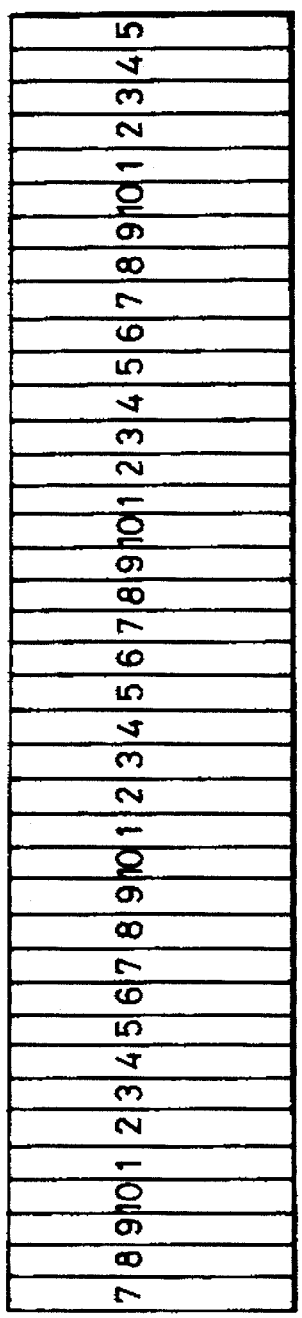
FIGS. 10A to 10C schematically illustrate the recording tracks when LP mode tracks are overwritten with SP mode tracks in accordance with the present invention (with the ratio of the track pitch of SP mode to LP mode being 3:2)
Figure 10B:
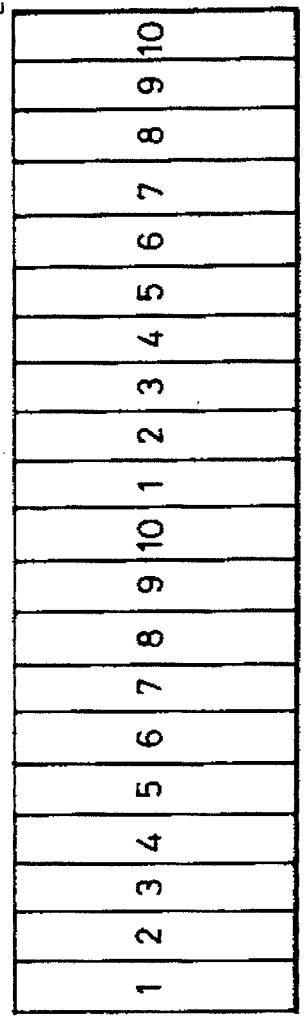
Figure 10C:
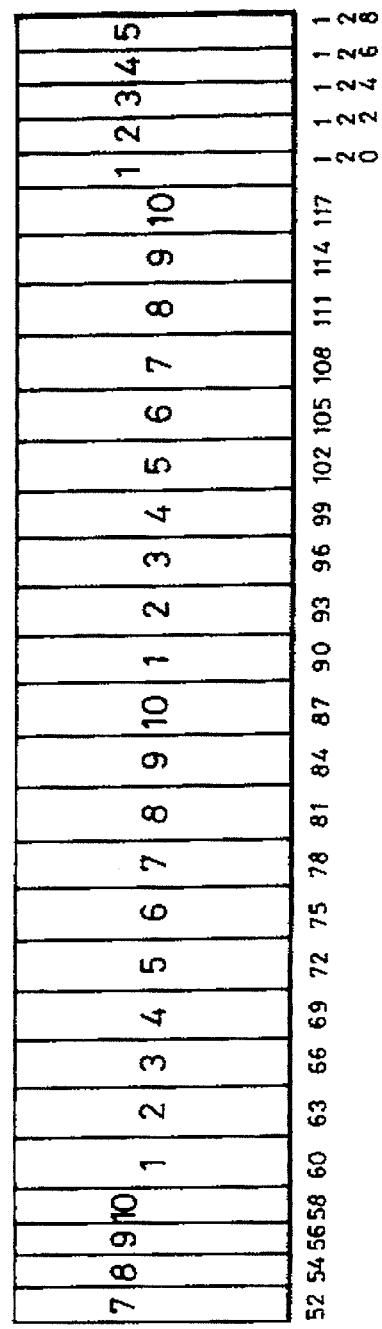

FIGS. 10A, 10B and 10C illustrate the track number assignments when LP tracks are overwritten with SP tracks and the ratio of the track pitch in SP mode to the track pitch in LP mode is 3:2. FIG. 10A shows tracks recorded in the LP mode. As shown, the tracks have been assigned absolute track numbers 52, 54, 56 . . . 126 and 128, respectively. Since the track pitch ratio is 3:2, the tracks recorded in LP mode increment by 2 as described above.

FIG. 10B illustrates two frames of image data in SP mode. These frames are recorded over LP recording tracks 60–118. The first SP track is assigned track number 60, which is the previous track number 58 incremented by 2 since the previous track was recorded in LP mode. The track numbers of the subsequent SP tracks increment by 3. Thus, the 20 SP tracks are assigned track numbers 60, 63, 66 . . . 114 and 117, respectively. The insertion of the SP tracks over the LP tracks is shown in FIG. 10C. As shown, tracks 52, 54, . . . 58 are LP tracks, tracks 60, 63, 66, . . . 117 are SP tracks and tracks 120, 122, . . . 128 are LP tracks. Thus, a respective track number is assigned to one and only one track.

In each of the above-described examples, no two tracks are assigned the same track number when signals are recorded in SP mode, LP mode or any combination thereof.

Another embodiment of the present invention is illustrated in FIGS. 11A and 11B. In this embodiment, the ratio of the track pitch in SP mode to the track pitch in LP mode is 2:1. In addition, the magnetic heads which record adjacent tracks have different azimuth angles (+, –), as shown. The azimuth angle of each recorded track is readily detected upon reproduction (for example, when a head with +azimuth angle scans a track that had been recorded with +azimuth angle, the amplitude of the reproduced signal is higher than if that head had scanned a track recorded with –azimuth angle) and thus, a track is identified by the combination of a track number and the azimuth angle.

FIG. 11A illustrates several tracks recorded in SP mode where the track number increments by 1 for each track. During reproduction of a track recorded in SP mode, the track is identified by its track number. In LP recording mode, pairs of tracks are assigned the same track number as shown in FIG. 11B. During reproduction of a track that had been recorded in LP mode, the track is identified by its track number and its azimuth angle. Therefore, no two tracks have the same track identification (track number and azimuth angle) and a track can be unambiguously identified whether it was recorded in SP mode or LP mode.

FIGS. 11C and 11D illustrate tracks recorded in SP mode and LP mode, respectively, when azimuth angles are not utilized in the identification of a track. As shown, track numbers increment in the manner shown in FIGS. 7 and 8, which is twice as fast as compared with the above-described embodiment shown in FIGS. 11A and 11B. By using the azimuth angle in addition to the track number to identify a track, one less bit is needed in the track number data stored in each track. Alternatively, if the same number of bits is used, twice as many tracks can be identified by using that number of bits plus the azimuth angle to identify a track.

In the above described embodiments of the present invention, every track on the magnetic tape is easily identified by its track number (and azimuth angle for the embodiment shown in FIGS. 11A and 11B). Therefore, the track number can be used as an absolute address of each track during a high-speed search mode or the like. In addition, the remaining length of the magnetic tape can be determined by obtaining the difference between the track number of the currently reproduced or recorded track (i.e. the track currently scanned by the magnetic head) and the track number of the final track (final track number). The final track number can be stored in a random access memory contained within a tape cassette and which is reproduced when the cassette is loaded into the video tape recorder of the present invention.

Definitions for the equations discussed below to determine the remaining length of tape are as follows:

Final Track Number: LT

Track Number of current track: GT

Track Number of first track in next frame: NT

Number of tracks in one frame: RT

Track Increment Number: TP (i.e. TP=2 during SP mode and TP=1 during LP mode when ratio of track pitch in SP mode to track pitch in LP mode is 2:1)

Number of frames per second: SF

In the determination of the remaining length of tape, the track number of the first track in the next frame (NT) is used as the present starting point location since tracks that record less than one frame are of no value to the user.

Let C represent the track number of increments per frame, so that C=TP×RT. Hence, for the SP mode, C=2×10=20; and for the LP mode, C=1×10=10. This has been shown in FIGS. 7 and 8.

The track number of the first track in the next frame (NT) can be determined from the track number of the current track (GT) by the equation NT=(INT (GT/C)+1)×C, where INT (GT/C) is the integer value (i.e. without the remainder) of the division GT/C. For example, if track 44 (shown in FIG. 7A) is the track number of the current track being scanned, then the track number of the first track in the next frame is calculated to be (INT (GT/C)+1)×C=(INT (44/20)+1)×20= (2 (remainder 4)+1)×20=(2+1)×20=60. FIG. 7A shows track number 60 as the first track in the next frame.

The amount of tape remaining from the first track in the next frame (NT) to the end of the tape, in terms of seconds, is represented by D, wherein D=INT[(LT+TP−NT)/(C×SF)]. Therefore, the number of remaining hours H, the number of remaining minutes M, the number of remaining seconds S and the remaining frames F are determined by the equations,

H=INT(D/3600),

M=INT(MOD(D/3600)/60),

S=MOD(MOD(D/3600)/60), and

F=INT(E/C), where MOD (D/3600) is the remainder in the division operation D÷3600 (it will be appreciated that, as used herein, the expression "MOD (A/B)" is the remainder in the division A÷B); and E is determined from the equation E=MOD [(LT+TP−NT)/(C×SF)]).

The following example is provided to verify the above equations. It is assumed that information, such as video data, is recorded at the rate of 30 frames per second (SF) and the magnetic tape has a total time recording capacity of 1 hour and 5 minutes (3900 seconds).

In the NTSC system, one frame of digital video data is recorded in 10 tracks (RT). If there are 10 tracks per frame (RT) and 30 frames per second (SF), then it follows that 300 tracks are recorded per second. Therefore, the total number of tracks on the tape equals 3900 seconds×300 tracks/ second, 1,170,000 tracks.

In a system where the ratio of the SP track pitch to the LP track pitch is 2:1, the track increment number TP=2 when signals are recorded in SP mode. Thus, the final track number is calculated as:

LT=1,170,000×TP−TP=2,339,998, since each track is incremented by 2 and the track number of the first track is 0. Assuming arbitrarily the present track number is 104, for example, the following values are established before the remaining length of tape is calculated:

Final track Number: LT=2,339,998

Track Number of current track: GT=104

Number of tracks in one frame: RT=10

Track Increment Number: TP=2

Number of frames per second: SF=30

Using the equations discussed above, and assuming that information is recorded in the SP mode,

C=2×10=20,

NT=(INT(104/20)+1)×20=120,

D=INT[(2339998+2−120)/(20×30)]=3899,

E=MOD((2339998+2−120)/(20×30))=480,

H=INT(3899/3600)=1,

M=INT(MOD(3899/3600)/60)=4,

S=MOD(MOD(3899/3600)/60)=59, and

F=INT(480/20)=24.

Therefore, the remaining length of the tape in the SP recording mode is 1 hour, 4 minutes, 59 seconds and 24 frames.

In the above example, the final track number of the tape was determined assuming that the remaining portion of the tape is recorded in the SP mode. To determine the remaining length of time for recording in the LP mode, the final track number determined for the SP mode must be converted by multiplying that final track number by the SP track pitch to LP track pitch ratio. Conversely, if the final track number had been determined for recording in the LP mode, that final track number must be converted by multiplying that number by the reciprocal of the SP track pitch to LP track pitch ratio for use in the SP recording mode. This conversion is performed prior to substituting the final track number in the above equations and is summarized in Table 1 below.

TABLE 1

|  | SP Recording Mode | LP Recording Mode |
| --- | --- | --- |
| Final track Number in SP Mode (SP mode final track number) | Unchanged | Multiply Final track Number by ratio |
| Final track Number in LP Mode (LP mode final track number) | Multiply final track Number by the reciprocal of ratio | Unchanged |

However, the above described conversion process additionally requires that the track number of the first track in the next frame be determined based upon whether the current track is in an SP recording area or an LP recording area.

Another method for calculating the remaining length of tape is to calculate the remaining length of tape on the assumption that the SP recording mode is used (if the final track number represents the final track in SP mode), then, multiply the calculated remaining length by the SP mode to LP mode track pitch ratio to obtain the remaining length in LP mode. Conversely, if the final track number represents the final track in the LP mode, the remaining length of tape may be calculated for the LP mode and then multiplied by the reciprocal of the SP mode to LP mode track pitch ratio to obtain the remaining length in SP mode.

In another embodiment of the present invention, the track number of a specified track is decremented by 2 during SP mode and decremented by 1 during LP mode when, for example, the ratio of the track pitches recorded in SP mode to LP mode is 2:1. In this embodiment, the track number of a track at the beginning of a magnetic tape is equal to the "final track number" as discussed in the previously-described embodiment of the present invention. For example, assume tracks having track numbers 0 to 49999, respectively, can be recorded on a magnetic tape, then, the first track at the beginning of the magnetic tape is assigned track number 49999. Successive tracks are assigned track numbers 49997, 49995, 49993, etc, respectively, during recording in the SP mode and successive tracks are assigned track numbers 49998, 49997, 49996, etc, respectively, during recording in the LP mode.

In the above-described embodiment of the present invention, every track on the magnetic tape can be identified by its track number. In addition, a track number identifies the number of tracks remaining on the magnetic tape and thus, the remaining length of the magnetic tape can be determined without the need to ascertain the "final track number" as is necessary in the previously-described embodiments.

Definitions for the equations discussed below to determine the remaining length of tape are as follows:

Track Number of current track: GT

Number of tracks in one frame: RT

Track Decrement Number: TP (i.e. TP=2 during SP mode and TP=1 during LP mode when ratio of track pitch in SP mode to track pitch in LP mode is 2:1)

Number of frames per second: SF

As indicated in the above definitions, TP represents the track decrement number, not the track increment number, and the track number of the first track in the next frame (NT) and the final track number (LT) are not utilized. Instead, the current track number (GT) is utilized to determine the remaining length of the magnetic tape.

Let C represent the track number of decrements per frame, so that C=TP×RT. The amount of tape remaining from the current track to the end of the tape, in terms of seconds, is represented by D, wherein D=INT[(GT+TP)/(C×SF)]. The number of remaining hours H, the number of remaining minutes M, the number of remaining seconds S and the remaining frames F are determined by the equations,

H=INT (D/3600),

M=INT(MOD(D/3600)/60),

S=MOD(MOD(D/3600)/60), and

F=INT(E/C).

where E=MOD[(GT+TP)/(C×SF)].

In this embodiment, the "final track number" which is normally assigned to the first track at the beginning of the magnetic tape can be stored in a random access memory located within the cassette housing the magnetic tape. In this instance, the track number of the track located at the beginning of the magnetic tape can be ascertained before recording simply by reproducing the "final track number" stored in the magnetic tape. Therefore, the memory in the cassette need only be accessed once.

In another embodiment of the present invention, the "final track number" may be stored in the first track at the beginning of the magnetic tape prior to any recording of an information signal. This may performed by the manufacturer of the magnetic tape or by a user. Then, prior to recording on the first track, the track number stored on the first track is reproduced so as to ascertain the current track number.

In the embodiments discussed above, the current track number and the final track number, if necessary, of a tape are ascertained when a cassette is loaded into the video tape recorder, the tape in that cassette not necessarily being at its beginning position (i.e. it may be disposed at any arbitrary position). However, it would be advantageous to determine the remaining length of recording (or playback) time on a tape without having to load the cassette into the recorder. This is accomplished by means of the remote control unit of the present invention.

Figure 12:
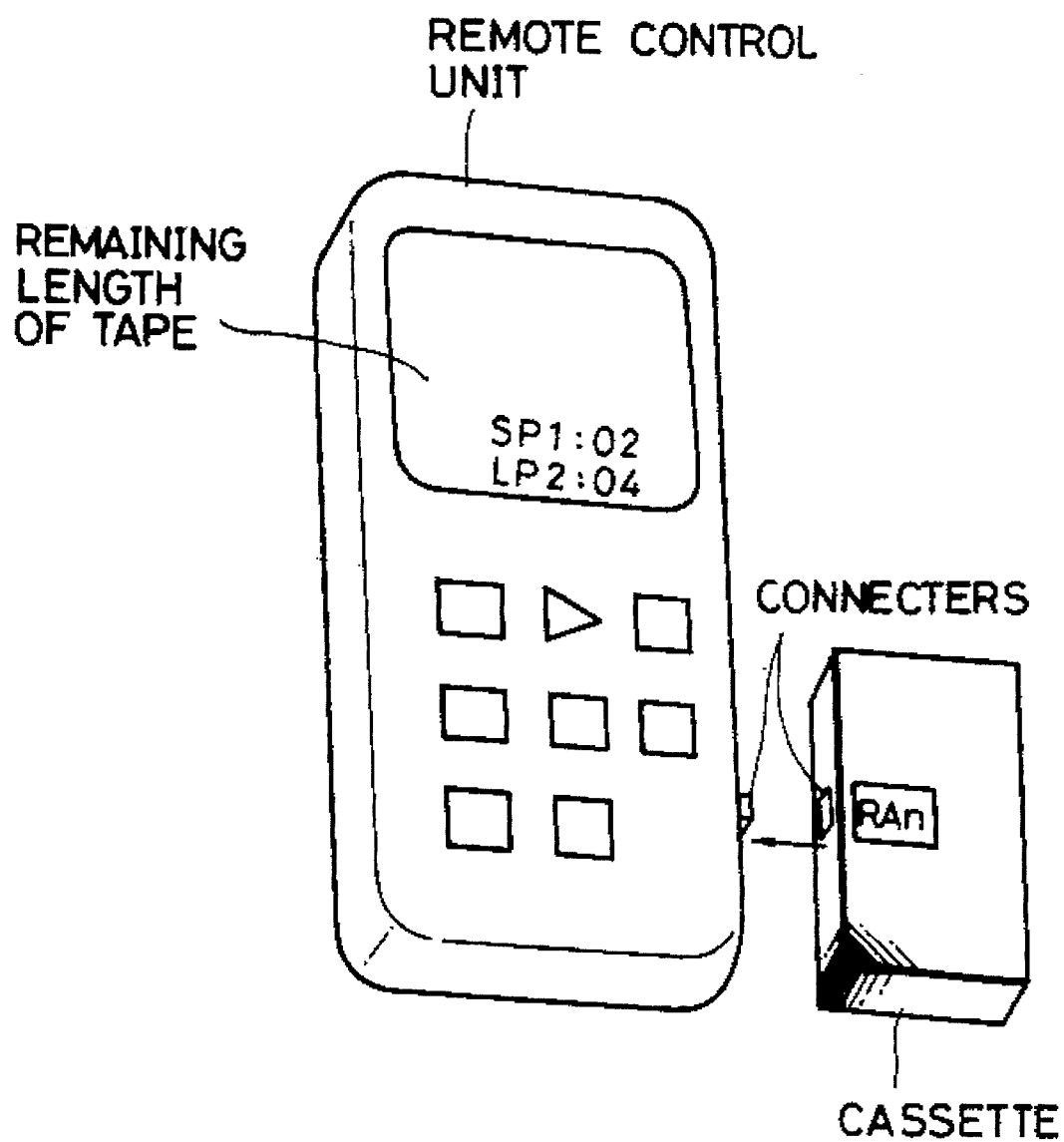
FIG. 12 illustrates a remote control unit capable of determining the remaining length of recording time on a tape in accordance with this invention.

FIG. 12 illustrates a remote control unit capable of determining the remaining length of recording (or playback) time on a tape. The remote control unit retrieves the current track number and final track number, if necessary, of a tape when the cassette is connected via an external connector to a connector in the remote control unit. The final track number and current track number are stored in a random access memory located in the cassette which is read by a microprocessor circuit in the remote control unit. The remaining length of time on the tape is easily calculated by the remote control unit using the above equations. The remaining length of time is then displayed in LP mode, SP mode or both on the remote control unit's display (e.g. a liquid crystal display). The remaining length of time may also be displayed on the video tape recorder display or in an area of the video image that selectably displays such data (e.g. date, time, counter, channel, etc) after the remote control unit has transmitted (e.g. by an infra-red signal) the information to the video tape recorder.

Figure 13:
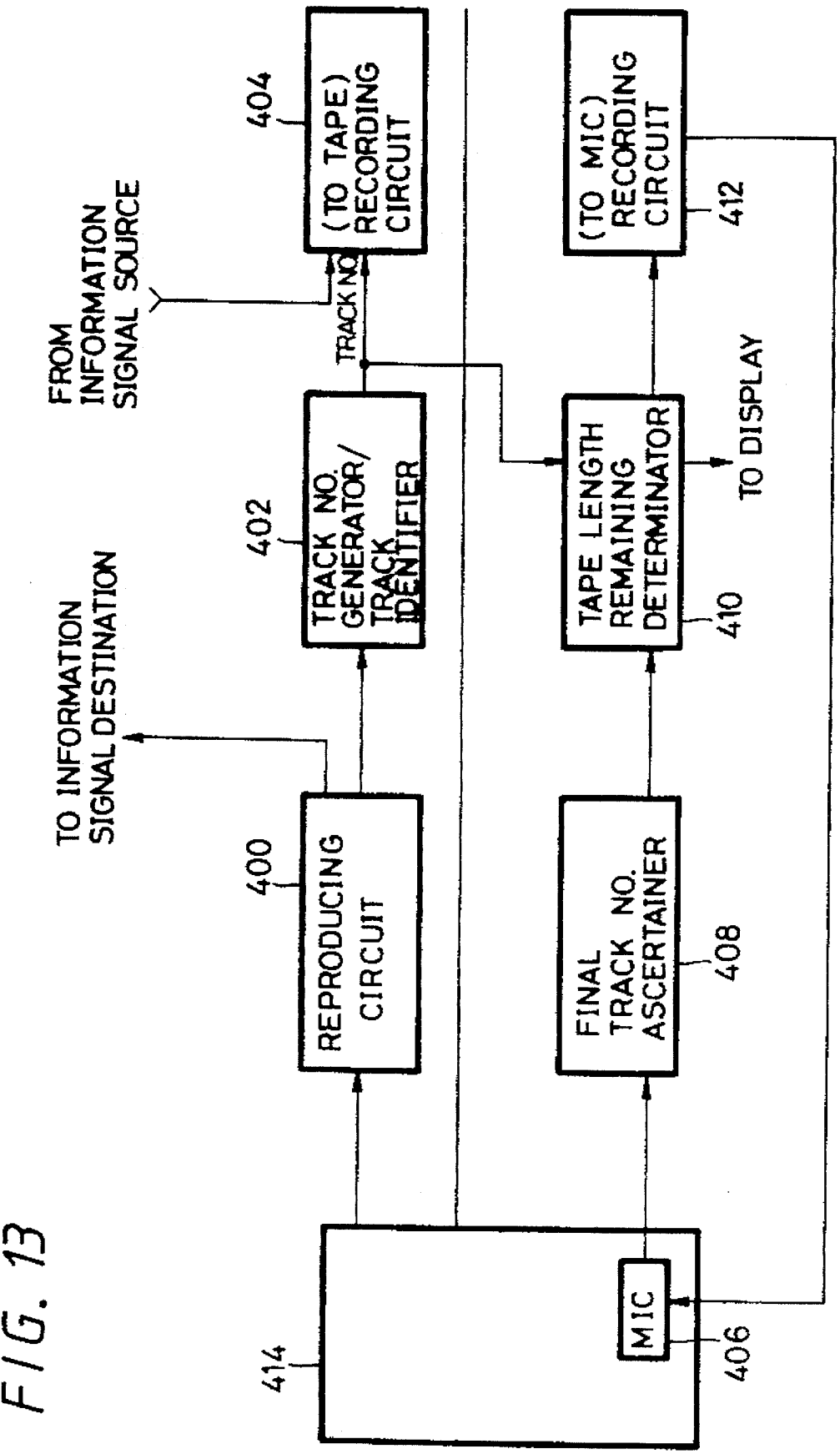
FIG. 13 is a block diagram of an embodiment of the present invention.

One arrangement of ascertaining a track number of a specified track and calculating the amount of tape remaining is described with reference to FIG. 13. FIG. 13 is a block diagram of one embodiment of the present invention and comprises reproducing circuit 400, track number generator/track identifier circuit 402, tape recording circuit 404, final track number ascertaining circuit 408, tape length remaining determinator 410 and memory in the cassette (MIC) write circuit 412. In addition, tape cassette 414 is illustrated as having a memory (MIC) 406 contained therein. During recording, an information signal is received from an external source (not shown) and supplied to tape recording circuit 404. Track number generator/track identifier circuit 402 ascertains a track number and supplies the track number to tape recording circuit 404 and also supplies the track number to tape length determinating circuit 410. Tape recording circuit 404 records the track number and information signal on a track on the magnetic tape in tape cassette 414.

The track number of the final track is produced by implementing the equations discussed above and is stored in memory 406 (MIC) in tape cassette 414 and is read therefrom by final track number ascertaining circuit 408. The final track number is supplied to tape length remaining determinator 410 from which the remaining length of tape is calculated. The remaining length of tape is displayed by a display (not shown).

During playback, reproducing circuit 400 reproduces the information signal and track number from the magnetic tape in tape cassette 414. The information signal is supplied to an external device (not shown) which, for example, displays the information signal. The reproduced signal is supplied to track number generator/track identifier circuit 402 which extracts the track number from the reproduced signal and supplies the track number to tape length remaining determinator 410. As discussed above, the final track number is read by final track number ascertaining circuit 408 from memory 406 in tape cassette 414 and supplied to tape length remaining determinator 410. The remaining length of tape is ascertained and displayed by a display (not shown).

In addition the ascertained remaining length of time and track number of a track being recorded or reproduced, can be stored in memory 406 in tape cassette 414 by write circuit 412.

Figure 14:
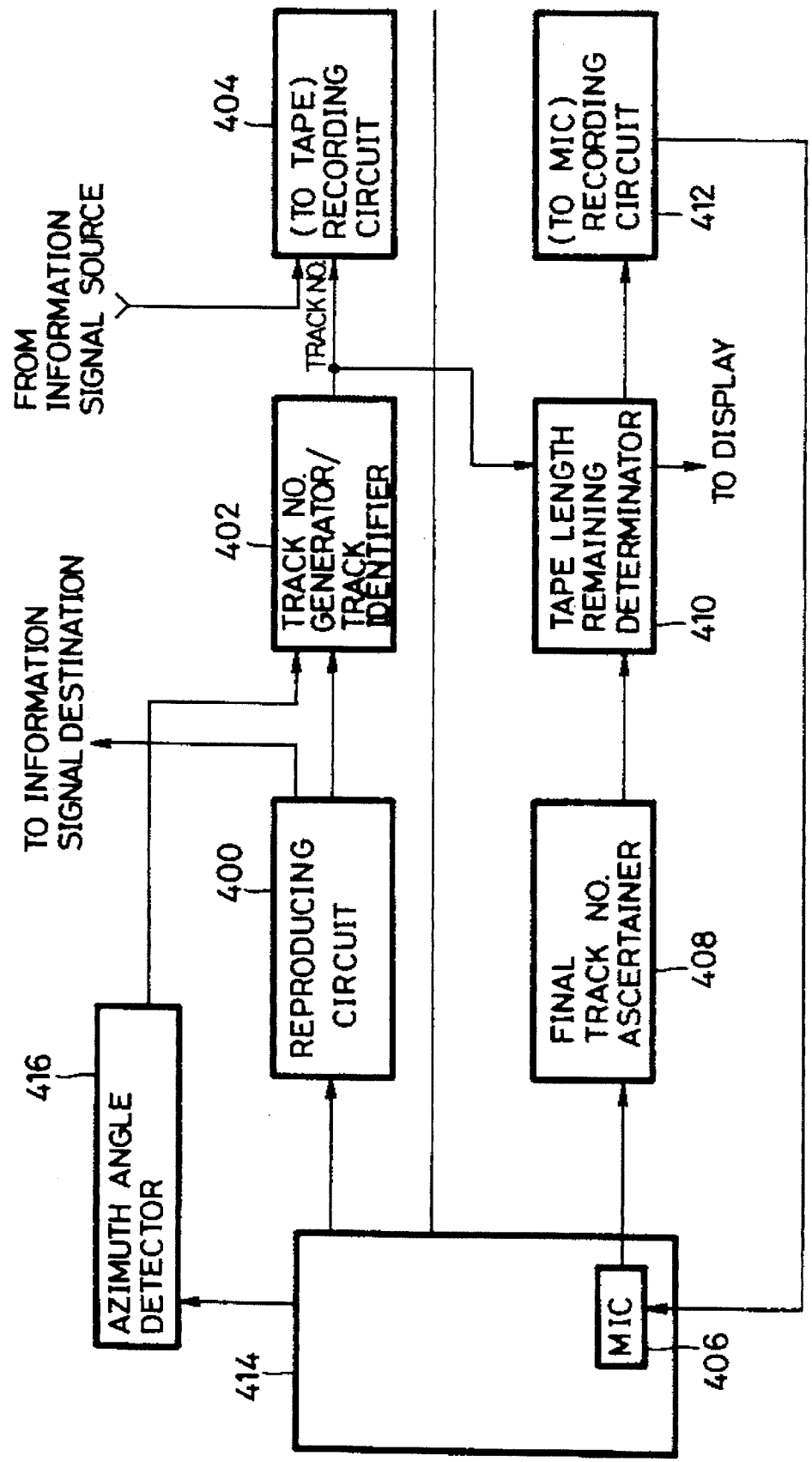
FIG. 14 is a block diagram of another embodiment of the present invention.

FIG. 14 is a block diagram illustrating the embodiment of the present invention as described with reference to FIGS. 11A to 11D. This embodiment functions in the same manner as the embodiment described with reference to FIG. 13, except azimuth angle detector 416 is utilized to detect the azimuth angle of a reproduced track. As shown, the detected azimuth angle is supplied to track number generator/track identifier circuit 402 which, along with the ascertained track number, identifies the reproduced track.

While the present invention has been particularly shown and described in conjunction with preferred embodiments thereof, it will be readily appreciated by those of ordinary skill in the art that various changes may be made without departing from the spirit and scope of the invention. For example, although only the SP and LP recording modes are indicated in each embodiment, the present invention is not limited to these recording modes and may easily accommodate additional recording modes.

As another example, although the present discussion is directed to video and audio information, the present invention is not limited solely to video and audio and may be widely applied to other types of signals referred to in the claims as information signals.

Still further, although the data structure of various areas of the coded information has been described, other data structures may readily and easily be used. For example, the absolute track number Tr may be of a different bit length than described and may be located in different areas of the track represented thereby.

Therefore, it is intended that the appended claims be interpreted as including the embodiments described herein, the alternatives mentioned above, and all equivalents thereto.

What is claimed is:

1. Apparatus for recording in selectable recording modes, track number data and information signals in recording tracks on a recording medium, comprising:

means for determining the track number of a track to be recorded by utilizing a ratio of a track pitch produced when a first recording mode is selected and a track pitch produced when a second recording mode is selected; and recording means for recording the track number with the information signal on the recording track.

2. The apparatus of claim 1, wherein the recording means records the track number, a video signal and an audio signal as a coded signal.

3. The apparatus of claim 2, wherein the track number is recorded in a subcode area of the coded signal.

4. The apparatus of claim 1, wherein the ratio of the track pitch of the first recording mode to the track pitch of the second recording mode is 2:1.

5. The apparatus of claim 1, wherein the ratio of the track pitch of the first recording mode to the track pitch of the second recording mode is 3:2.

6. The apparatus of claim 1, wherein the means for determining determines the track number by increasing a track number of a preceding track by a numerator of the ratio when the preceding track was recorded in the first recording mode and by a denominator of the ratio when the preceding track was recorded in the second recording mode.

7. The apparatus of claim 1, further comprising means for ascertaining a final track number corresponding to an end of the recording medium and means for determining an amount of recording time remaining on the recording medium by utilizing the final track number and a current track number, the current track number identifying a location on the recording medium at which the information signal is recorded.

8. The apparatus of claim 7, wherein the current track number is the track number determined by the means for determining the track number of a track to be recorded.

9. The apparatus of claim 7, wherein the recording medium is disposed in a housing and further comprising a memory located in the housing for storing a predetermined final track number and wherein the means for ascertaining the final track number reproduces the predetermined final track number stored in said memory.

10. The apparatus of claim 9, wherein the memory located in the housing is a random access memory.

11. The apparatus of claim 7, wherein the recording medium is disposed in a housing and further comprising a memory located in the housing and means for storing the final track number and the current track number in said memory.

12. The apparatus of claim 11, wherein the memory located in the housing is a random access memory.

13. The apparatus of claim 7, further comprising a remote control unit and wherein said means for ascertaining the final track number and said means for determining an amount of recording time remaining on the recording medium are located in said remote control unit.

14. The apparatus of claim 1, wherein the means for determining determines the track number by decreasing a track number of a preceding track by a numerator of the ratio when the preceding track was recorded in the first recording mode and by a denominator of the ratio when the preceding track was recorded in the second recording mode.

15. The apparatus of claim 14, wherein the track number of a first track at a beginning of the recording medium contains a predetermined track number, the predetermined track number being a maximum number of tracks that can be recorded on a total recording length of the recording medium and wherein the means for determining the track number reproduces the predetermined track number stored at the beginning of the recording medium when the track to be recorded is at the beginning of the recording medium.

16. The apparatus of claim 14, wherein the recording medium is disposed in a housing and further comprising a memory located in the housing for storing a predetermined track number corresponding to a maximum number of tracks that can be recorded on a total recording length of the recording medium and wherein the means for determining the track number reproduces the predetermined track number stored in said memory located in the housing when the track to be recorded is at the beginning of the recording medium.

17. The apparatus of claim 14, further comprising means for determining an amount of recording time remaining on the recording medium by utilizing a current track number, the current track number identifying a location on the recording medium at which the information signal is recorded.

18. The apparatus of claim 17, wherein the current track number is the track number determined by the means for determining the track number of a track to be recorded.

19. The apparatus of claim 1, further comprising reproducing means for reproducing the track number and the information signal from the recording medium.

20. The apparatus of claim 19, wherein the information signal is a video signal and an audio signal.

21. The apparatus of claim 20, wherein the signal recorded on the recording medium which is reproduced by the reproducing means includes a coded signal containing the track number.

22. The apparatus of claim 21, wherein the track number is reproduced from a subcode area of the coded signal.

23. The apparatus of claim 19, wherein the recording medium is disposed in a housing and further comprising a memory located in the housing for storing a predetermined final track number corresponding to an end of the recording medium, means for reproducing the predetermined final track number stored in said memory and means for determining an amount of recording time remaining on the recording medium by utilizing the reproduced predetermined final track number and a current track number, the current track number identifying a location on the recording medium at which the information signal is recorded.

24. The apparatus of claim 23, wherein the current track number is the track number reproduced by the reproducing means for reproducing the track number and the information signal when the track number and the information signal are reproduced and is the track number determined by the means for determining the track number of a track to be recorded when the track is to be recorded.

25. The apparatus of claim 23, wherein the memory located in the housing is a random access memory.

26. The apparatus of claim 23, further comprising a remote control unit and wherein the means for reproducing the predetermined final track number and the means for determining an amount of recording time remaining on the recording medium are located in the remote control unit.

27. The Apparatus of claim 1, wherein said apparatus is operable to record in first and second selectable recording modes which record said information signal in successive recording tracks with different azimuth angles and exhibiting track pitches having a ratio of 2;

wherein said means for determining determines the track number of the track to be recorded by incrementing a track number of a previously recorded track when the first recording mode is selected and by incrementing the track number of the previously recorded track at alternate tracks when the second recording mode is selected; and the recording track is identified by the recorded track number when the first recording mode is selected and by the recorded track number plus the azimuth angle of the recording track when the second recording mode is selected.

28. The apparatus of claim 27, further comprising reproducing means for reproducing the track number with the information signal from the recording track, means for detecting the azimuth angle of the track on which the track number is recorded, and means for identifying the reproduced track by the reproduced track number when the reproduced track was recorded in the first recording mode and by the reproduced track number plus the azimuth angle of the reproduced track when the reproduced track was recorded in the second recording mode.

29. A method for recording in selectable recording modes, track number data and information signals in recording tracks on a recording medium, comprising the steps of:

determining the track number of a track to be recorded by utilizing a ratio of a track pitch produced when a first recording mode is selected and a track pitch produced when a second recording mode is selected; and recording the track number with the information signal on the recording track.

30. The method of claim 29, wherein the recording step records the track number, a video signal and an audio signal as a coded signal.

31. The method of claim 30, wherein the recording step records the track number in a subcode area of the coded signal.

32. The method of claim 29, wherein the ratio of the track pitch of the first recording mode to the track pitch of the second recording mode is 2:1.

33. The method of claim 29, wherein the ratio of the track pitch of the first recording mode to the track pitch of the second recording mode is 3:2.

34. The method of claim 29, wherein the determining step determines the track number by increasing a track number of a preceding track by a numerator of the ratio when the preceding track was recorded in the first recording mode and by a denominator of the ratio when the preceding track was recorded in the second recording mode.

35. The method of claim 29, further comprising the steps of ascertaining a final track number corresponding to an end of the recording medium and determining an amount of recording time remaining on the recording medium by utilizing the final track number and a current track number, the current track number identifying a location on the recording medium at which the information signal is recorded.

36. The method of claim 35, wherein the current track number is the track number determined by the step of determining the track number of a track to be recorded.

37. The method of claim 35, wherein the recording medium is disposed in a housing and wherein a memory device is located in said housing to store a predetermined final track number; and wherein the step of ascertaining the final track number reproduces said predetermined final track number stored in said memory.

38. The method of claim 37, further comprising the step of storing the current track number in said memory.

39. The method of claim 29, wherein the step of determining determines the track number by decreasing a track number of a preceding track by a numerator of the ratio when the preceding track was recorded in the first recording mode and by a denominator of the ratio when the preceding track was recorded in the second recording mode.

40. The method of claim 39, wherein the track number of a first track at a beginning of the recording medium contains a predetermined track number, the predetermined track number being a maximum number of tracks that can be recorded on a total recording length of the recording medium and wherein the step of determining the track number reproduces the predetermined track number stored at the beginning of the recording medium when the track to be recorded is at the beginning of the recording medium.

41. The method of claim 39, wherein the recording medium is stored in a housing and wherein a memory device is located in said housing to store a predetermined track number corresponding to a maximum number of tracks that can be recorded on a total recording length of the recording medium; and wherein the step of determining retrieves said predetermined number from said memory when the track to be recorded is at the beginning of the recording medium.

42. The method of claim 39, further comprising the step of determining an amount of recording time remaining on the recording medium by utilizing a current track number, the current track number identifying a location on the recording medium at which the information signal is recorded.

43. The method of claim 42, wherein the current track number is the track number determined by the step of determining the track number of a track to be recorded.

44. The method of claim 29, further comprising the step of reproducing the track number and the information signal from the recording medium.

45. The method of claim 44, wherein the reproducing step reproduces a coded signal containing the track number.

46. The method of claim 45, wherein the reproducing step reproduces the track number from a subcode area of the coded signal.

47. The method of claim 44, wherein the recording medium is disposed in a housing and wherein a memory device is located in said housing to store a predetermined final track number; and further comprising the steps of retrieving said predetermined final track number from said memory device, and determining an amount of recording time remaining on the recording medium by utilizing the reproduced predetermined final track number and a current track number, the current track number identifying a location on the recording medium at which the information signal is recorded.

48. The method of claim 29, wherein said information signal is recorded in successive recording tracks with different azimuth angles, in first and second selectable recording modes to produce tracks exhibiting respective track pitches having a ratio of 2;

wherein the track number of the track to be recorded is determined by incrementing a track number of a previously recorded track when the first recording mode is selected and by incrementing the track number of the previously recorded track at alternate tracks when the second recording mode is selected; and the recording track is identified by the recorded track number when the first recording mode is selected and by the recorded track number plus the azimuth angle of the recording track when the second recording mode is selected.

49. The method of claim 48, further comprising the steps of reproducing the track number with the information signal from the recording track, detecting the azimuth angle of the track on which the track number is recorded, and identifying the reproduced track by the reproduced track number when the reproduced track was recorded in the first recording mode and by the reproduced track number plus the azimuth angle of the reproduced track when the reproduced track was recorded in the second recording mode.

* * * * *